US009224090B2

(12) United States Patent
Piekniewski et al.

(10) Patent No.: US 9,224,090 B2
(45) Date of Patent: Dec. 29, 2015

(54) SENSORY INPUT PROCESSING APPARATUS IN A SPIKING NEURAL NETWORK

(75) Inventors: Filip Piekniewski, San Diego, CA (US); Eugene Izhikevich, San Diego, CA (US); Botond Szatmary, San Diego, CA (US); Csaba Petre, San Diego, CA (US)

(73) Assignee: Brain Corporation, San Diego, CA (US)

( * ) Notice: Subject to any disclaimer, the term of this patent is extended or adjusted under 35 U.S.C. 154(b) by 617 days.

(21) Appl. No.: 13/465,903

(22) Filed: May 7, 2012

(65) Prior Publication Data

US 2013/0297542 A1    Nov. 7, 2013

(51) Int. Cl.
*G06N 3/04*    (2006.01)

(52) U.S. Cl.
CPC . *G06N 3/04* (2013.01); *G06N 3/049* (2013.01)

(58) Field of Classification Search
None
See application file for complete search history.

(56) References Cited

U.S. PATENT DOCUMENTS

| | | |
|---|---|---|
| 5,063,603 A | 11/1991 | Burt |
| 5,138,447 A | 8/1992 | Shen et al. |
| 5,216,752 A | 6/1993 | Tam |
| 5,272,535 A | 12/1993 | Elabd |
| 5,355,435 A | 10/1994 | Deyong et al. |
| 5,638,359 A | 6/1997 | Peltola et al. |
| 5,652,594 A | 7/1997 | Costas |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |
| 6,035,389 A | 3/2000 | Grochowski |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

Daniel Bush, "STDP, Rate-coded Hebbian Learning and Auto-Associative Network Models of the Hippocampus", Sep. 2008, University of Sussex, pp. 1-109.*

(Continued)

*Primary Examiner* — David Vincent
*Assistant Examiner* — Paulinho E Smith
(74) *Attorney, Agent, or Firm* — Gazdzinski & Associates, PC

(57) ABSTRACT

Apparatus and methods for feedback in a spiking neural network. In one approach, spiking neurons receive sensory stimulus and context signal that correspond to the same context. When the stimulus provides sufficient excitation, neurons generate response. Context connections are adjusted according to inverse spike-timing dependent plasticity. When the context signal precedes the post synaptic spike, context synaptic connections are depressed. Conversely, whenever the context signal follows the post synaptic spike, the connections are potentiated. The inverse STDP connection adjustment ensures precise control of feedback-induced firing, eliminates runaway positive feedback loops, enables self-stabilizing network operation. In another aspect of the invention, the connection adjustment methodology facilitates robust context switching when processing visual information. When a context (such an object) becomes intermittently absent, prior context connection potentiation enables firing for a period of time. If the object remains absent, the connection becomes depressed thereby preventing further firing.

27 Claims, 26 Drawing Sheets

(56) References Cited

U.S. PATENT DOCUMENTS

| | | | |
|---|---|---|---|
| 6,418,424 B1 | 7/2002 | Hoffberg et al. | |
| 6,458,157 B1 | 10/2002 | Suaning | |
| 6,509,854 B1 | 1/2003 | Morita | |
| 6,545,705 B1 | 4/2003 | Sigel et al. | |
| 6,545,708 B1 | 4/2003 | Tamayama | |
| 6,546,291 B2 | 4/2003 | Merfeld et al. | |
| 6,581,046 B1 | 6/2003 | Ahissar | |
| 6,625,317 B1 | 9/2003 | Gaffin et al. | |
| 7,054,850 B2 | 5/2006 | Matsugu | |
| 7,565,203 B2 | 7/2009 | Greenberg et al. | |
| 7,580,907 B1 | 8/2009 | Rhodes | |
| 7,639,886 B1 | 12/2009 | Rastogi | |
| 7,653,255 B2 | 1/2010 | Rastogi | |
| 7,737,933 B2 | 6/2010 | Yamano et al. | |
| 7,765,029 B2 | 7/2010 | Fleischer et al. | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,154,436 B2 | 4/2012 | Szajnowski | |
| 8,160,354 B2 | 4/2012 | Paquier | |
| 8,200,593 B2 | 6/2012 | Guillen | |
| 8,281,997 B2 | 10/2012 | Moran et al. | |
| 8,311,965 B2 | 11/2012 | Breitwisch | |
| 8,315,305 B2 | 11/2012 | Petre | |
| 8,346,692 B2 | 1/2013 | Rouat et al. | |
| 8,390,707 B2 | 3/2013 | Yamashita | |
| 8,416,847 B2 | 4/2013 | Roman | |
| 8,467,623 B2 | 6/2013 | Izhikevich | |
| 8,515,160 B1 | 8/2013 | Khosla et al. | |
| 8,583,286 B2 | 11/2013 | Fleischer et al. | |
| 8,712,939 B2 | 4/2014 | Szatmary et al. | |
| 8,712,941 B2* | 4/2014 | Izhikevich et al. | 706/27 |
| 8,719,199 B2* | 5/2014 | Izhikevich et al. | 706/23 |
| 8,725,658 B2* | 5/2014 | Izhikevich et al. | 706/10 |
| 8,725,662 B2* | 5/2014 | Izhikevich et al. | 706/12 |
| 8,756,183 B1 | 6/2014 | Daily et al. | |
| 8,775,341 B1 | 7/2014 | Commons | |
| 8,793,205 B1 | 7/2014 | Fisher et al. | |
| 8,943,008 B2 | 1/2015 | Ponulak et al. | |
| 8,972,315 B2 | 3/2015 | Szatmary et al. | |
| 8,977,582 B2 | 3/2015 | Richert | |
| 8,983,216 B2 | 3/2015 | Izhikevich et al. | |
| 8,990,133 B1 | 3/2015 | Ponulak et al. | |
| 8,996,177 B2 | 3/2015 | Coenen | |
| 2002/0038294 A1 | 3/2002 | Matsugu | |
| 2003/0050903 A1 | 3/2003 | Liaw | |
| 2003/0216919 A1* | 11/2003 | Roushar | 704/260 |
| 2003/0222987 A1 | 12/2003 | Karazuba | |
| 2004/0054964 A1 | 3/2004 | Bozdagi | |
| 2004/0136439 A1 | 7/2004 | Dewberry | |
| 2004/0170330 A1 | 9/2004 | Fogg | |
| 2004/0193670 A1 | 9/2004 | Langan et al. | |
| 2004/0220082 A1 | 11/2004 | Surmeier et al. | |
| 2005/0015351 A1 | 1/2005 | Nugent | |
| 2005/0036649 A1 | 2/2005 | Yokono et al. | |
| 2005/0096539 A1 | 5/2005 | Leibig | |
| 2005/0283450 A1 | 12/2005 | Matsugu | |
| 2006/0094001 A1 | 5/2006 | Torre | |
| 2006/0129728 A1 | 6/2006 | Hampel | |
| 2006/0161218 A1 | 7/2006 | Danilov | |
| 2007/0022068 A1* | 1/2007 | Linsker | 706/23 |
| 2007/0176643 A1 | 8/2007 | Nugent | |
| 2007/0208678 A1 | 9/2007 | Matsugu | |
| 2008/0100482 A1 | 5/2008 | Lazar | |
| 2008/0174700 A1 | 7/2008 | Takaba | |
| 2008/0199072 A1 | 8/2008 | Kondo | |
| 2008/0201282 A1 | 8/2008 | Garcia et al. | |
| 2008/0237446 A1 | 10/2008 | Oshikubo | |
| 2009/0043722 A1 | 2/2009 | Nugent | |
| 2009/0287624 A1 | 11/2009 | Rouat et al. | |
| 2010/0036457 A1 | 2/2010 | Sarpeshkar | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar | |
| 2010/0235310 A1* | 9/2010 | Gage et al. | 706/14 |
| 2010/0299296 A1* | 11/2010 | Modha et al. | 706/25 |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0134242 A1 | 6/2011 | Loubser | |
| 2011/0137843 A1* | 6/2011 | Poon et al. | 706/33 |
| 2011/0160741 A1 | 6/2011 | Asano | |
| 2011/0184556 A1* | 7/2011 | Seth et al. | 700/249 |
| 2011/0206122 A1 | 8/2011 | Lu et al. | |
| 2011/0235698 A1* | 9/2011 | Petre et al. | 375/240.01 |
| 2012/0011090 A1 | 1/2012 | Tang | |
| 2012/0083982 A1 | 4/2012 | Bonefas | |
| 2012/0084240 A1 | 4/2012 | Esser et al. | |
| 2012/0109866 A1 | 5/2012 | Modha | |
| 2012/0117012 A1* | 5/2012 | Szatmary et al. | 706/27 |
| 2012/0303091 A1 | 11/2012 | Izhikevich | |
| 2012/0308076 A1* | 12/2012 | Piekniewski et al. | 382/103 |
| 2012/0308136 A1 | 12/2012 | Izhikevich | |
| 2012/0330872 A1 | 12/2012 | Esser et al. | |
| 2013/0046716 A1 | 2/2013 | Chan et al. | |
| 2013/0073484 A1* | 3/2013 | Izhikevich et al. | 706/10 |
| 2013/0073491 A1* | 3/2013 | Izhikevich et al. | 706/15 |
| 2013/0073492 A1* | 3/2013 | Izhikevich et al. | 706/23 |
| 2013/0073495 A1* | 3/2013 | Izhikevich et al. | 706/25 |
| 2013/0073496 A1 | 3/2013 | Szatmary | |
| 2013/0073498 A1* | 3/2013 | Izhikevich et al. | 706/27 |
| 2013/0073499 A1* | 3/2013 | Izhikevich et al. | 706/27 |
| 2013/0073500 A1 | 3/2013 | Szatmary | |
| 2013/0103626 A1* | 4/2013 | Hunzinger | 706/16 |
| 2013/0117212 A1 | 5/2013 | Hunzinger et al. | |
| 2013/0151450 A1 | 6/2013 | Ponulak | |
| 2013/0204814 A1 | 8/2013 | Hunzinger et al. | |
| 2013/0204820 A1 | 8/2013 | Hunzinger et al. | |
| 2013/0218821 A1 | 8/2013 | Szatmary | |
| 2013/0251278 A1 | 9/2013 | Izhikevich | |
| 2013/0297539 A1* | 11/2013 | Piekniewski et al. | 706/20 |
| 2013/0297541 A1* | 11/2013 | Piekniewski et al. | 706/26 |
| 2013/0297542 A1* | 11/2013 | Piekniewski et al. | 706/27 |
| 2013/0304683 A1 | 11/2013 | Lo | |
| 2013/0325766 A1* | 12/2013 | Petre et al. | 706/15 |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1* | 12/2013 | Petre et al. | 706/26 |
| 2014/0012788 A1* | 1/2014 | Piekniewski | 706/16 |
| 2014/0016858 A1 | 1/2014 | Richert | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy | |
| 2014/0064609 A1* | 3/2014 | Petre et al. | 382/159 |
| 2014/0122397 A1* | 5/2014 | Richert et al. | 706/15 |
| 2014/0122398 A1 | 5/2014 | Richert | |
| 2014/0122399 A1 | 5/2014 | Szatmary | |
| 2014/0156574 A1 | 6/2014 | Piekniewski | |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008137066 A1 | 11/2008 |

OTHER PUBLICATIONS

Berkes and Wiskott. Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnespages,cwi,n11-sbolltedmblica6ond)hdthesislxif>.

Brette et al., Brian: a simple and flexible simulator for spiking neural networks, The Neuromorphie Engineer, Jul. 1, 2009, pp. 1-4, doi: 10.2417/1200906.1659.

(56) References Cited

OTHER PUBLICATIONS

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Field, G.; Chichilnisky, E. Information Processing in the Primate Retina: Circuitry and Coding. *Annual Review of Neuroscience*, 2007, 30(1), 1-30.

Fiete, et al. Spike-Time-Dependent Plasticity and Heterosynaptic Competition Organize Networks to Produce Long Scale-Free Sequences of Neural Activity. *Neuron* 65, Feb. 25, 2010, pp. 563-576.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p. df >.

Földiák, P. Learning invariance from transformation sequences. *Neural Computation*, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gerstner et al. (1996) A neuronal learning rule for sub-millisecond temporal coding. *Nature* vol. 383 (6595) pp. 76-78.

Gewaltig et al., 'NEST (Neural Simulation Tool)', Scholarpedia, 2007, pp. 1-15, 2(4): 1430, doi: 10.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+GENERALIZATION+AND+REPRESENTATIO N+I N +ADAPTIVE+ NETWORK+MODELS+OF+CATEGORY+LEARN I NG%22+1991.

Gollisch et al. 'Rapid neural coding in the retina with relative spike latencies.' Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.

Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*,18:245-282.

Izhikevich et al., 'Relating STDP to BCM', Neural Computation (2003) 15, 1511-1523.

Izhikevich, E.M. (2007) Dynamical Systems in Neuroscience: The Geometry of Excitability and Bursting, *The MIT Press*, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. *Network, Computation in Neural Systems*, 2006, 17 (1), 31-41.

Karbowski et al., 'Multispikes and Synchronization in a Large Neural Network with Temporal Delays', Neural Computation 12, 1573-1606 (2000).

Khotanzad, Alireza, Classification of invariant image representations using a neural network, IEEE. Transactions on Acoustics, Speech, and Signal Processing vol. 38 No. 6 Jun. 1990 pp. 1028-1038.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Knoblauch, et al. Memory Capacities for Synaptic and Structural Plasticity, *Neural Computation* 2009, pp. 1-45.

Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.

Laurent, 'The Neural Network Query Language (NNQL) Reference' [retrieved on Nov. 12, 2013]. Retrieved from the Internet: <URL 'https://code.google.com/p/nnql/issues/detail?id=1>.

Lazar et al. 'A video time encoding machine', in Proceedings of the 15th IEEE International Conference on Image Processing (ICIP '08), 2008, pp. 717-720.

Lazar et al. 'Consistent recovery of sensory stimuli encoded with MIMO neural circuits.' Computational intelligence and neuroscience (2010): 2.

Lazar et al. 'Multichannel time encoding with integrate-and-fire neurons.' Neurocomputing 65 (2005): 401-407.

Masquelier and Thorpe. Learning to recognize objects using waves of spikes and Spike Timing-Dependent Plasticity. *Neural Networks* (IJCNN), *The 2010 International Joint Conference on DOI*—10.1109/IJCNN.2010.5596934 (2010) pp. 1-8.

Masquelier, Timothee, 'Relative spike time coding and Stop-based orientation selectivity in the early visual system in natural continuous and saccadic vision: a computational model.' Journal of computational neuroscience 32.3 (2012): 425-441.

Meister, M. Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Nichols, A Re configurable Computing Architecture for Implementing Artificial Neural Networks on FPGA, Master's Thesis, The University of Guelph, 2003, pp. 1-235.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Paugam-Moisy et al. 'Computing with spiking neuron networks.' Handbook of Natural Computing, 40 p. Springer, Heidelberg (2009).

Paugam-Moisy et al., "Computing with spiking neuron networks" G. Rozenberg T, Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis, Universita di Granada* Mar. 28, 2008, pp. 1-104.

Sato et al., 'Pulse interval and width modulation for video transmission.' Cable Television, IEEE Transactions on 4 (1978): 165-173.

(56) References Cited

OTHER PUBLICATIONS

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain, *Neuron*, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from <URL: http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary B. and Izhikevich E. M. (2010) Spike-Timing Theory of Working Memory. *PLoS Computational Biology*, 6(8): e1000879.

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi% 2F10.1371 %2Fjournal.pcbi.10008 79#>.

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe, S.J., Delorme, A. & VanRullen, R. (2001). Spike-based strategies for rapid processing. *Neural Networks* 14, pp. 715-725.

Thorpe, S.J., Guyonneau, R., Guilbaud, N., Allegraud, J-M. & VanRullen, R. (2004). SpikeNet: real-time visual processing with one spike per neuron. *Neurocomputing*, 58-60, pp. 857-864.

Tim Gollisch* and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

VanRullen, R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wang 'The time dimension for scene analysis.' Neural Networks, IEEE Transactions on 16.6 (2005): 1401-1426.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System". Jun. 2005.

Wysoski et al, "Fast and Adaptive Network of Spiking Neuron for Multi-view Visual Pattern Recognition", May 3, 2008, Elsevier, Neurocomputing vol. 71, pp. 2563-2575.

Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.

Chistiakova, Marina, and Maxim Volgushev. "Heterosynaptic plasticity in the neocortex." Experimental brain research 199.3-4 (2009): 377-390.

FLORIAN03, Biologically inspired neural networks for the control of embodied agents, Technical Report Coneural-03-03 Version 1.0 [online], Nov. 30, 2003 [retrieved on Nov. 24, 2014]. Retrieved from the Internet: <URL:http:// citeseerx.ist.psu.edu/viewdoc/download-?doi=10.1.1.216.4931&rep1&type=pdf>.

Glackin, C.; Maguire, L.; McDaid, L., Feature extraction from spectra-temporal signals using dynamic synapses, recurrency, and lateral inhibition, Neural Networks (IJCNN), The 2010 International Joint Conference on DOI: 10.1109/IJCNN.2010.5596818 Publication Year: 2010, pp. 1-6.

Itti, Laurent, and Christof Koch. "Computational modelling of visual attention." Nature reviews neuroscience 2.3 (2001): pp. 194-203.

Kazantsev, et al., "Active Spike Transmission in the Neuron Model With a Winding Threshold Maniford", Jan. 3, 2012, 205-211, 7 pages.

Kling-Petersen, PhD, "Sun and HPC: From Systems to PetaScale" Sun Microsystems, no date, 31 pages.

Leydesdorff, Loet and Stephen Bensman, Classification and Powerlaws: The Logarithmic Transformation (2006), Journal of the American Society for Information Science and Technology (forthcoming).

Li, Zhaoping. "A saliency map in primary visual cortex." Trends in cognitive sciences 6.1 (2002): 9-16.

Markram, Henry, et al. "Regulation of synaptic efficacy by coincidence of postsynaptic APs and EPSPs." Science 275.5297 (1997): 213-215.

Martinez-Perez, et al., "Automatic Activity Estimation Based on Object Behavior Signature", 2010, 10 pages.

Matsugu, et al., "Convolutional Spiking Neural Network for Robust Object Detection with Population Code Using Structured Pulse Packets", 2004, 39-55, 17 pages.

Medini, C.; Subramaniyam, S.; Nair, B.; Diwakar, S., Modeling cerebellar granular layer excitability and combinatorial computation with spikes, Bio-Inspired Computing: Theories and Applications (BIC-TA), 2010 IEEE Fifth International Conference on DOI: 10.1109/BICTA.201 0.5645274, Publication Year: 2010, pp. 1495-1503.

Meinhardt, Hans, and Alfred Gierer. "Pattern formation by local self-activation and lateral inhibition." Bioessays 22.8 (2000): 753-760.

Niv, et al., Evolution of Reinforcement Learning in Uncertain Environments: A Simple Explanation for Complex Foraging Behaviors, International Society for Adaptive Behavior, 2002, vol. 10(1), pp. 5-24.

Ostojic, Srdjan, Nicolas Brunel, From Spiking Neuron Models to Linear-Nonlinear Models, Jan. 2011,vol. 7, Issue 1, e1001056.

Ramachandran, et al., "The Perception of Phantom Limbs", The D.O. Hebb Lecture, Center for Brain and Cognition, University of California, 1998, 121, 1603-1630, 28 pages.

Ruan, Chengmei; Qingxiang Wu; Lijuan Fan; Zhigiang Zhuo; Xiaowei Wang, Competitive behaviors of a spiking neural network with spike timing dependent plasticity, Biomedical Engineering and Informatics (BMEI), 2012 5th International Conference on DOI: 10.11 09/BMEI.2012.6513088 Publication Year: 2012 , pp. 1015-1019.

Stringer, et al., "Invariant Object Recognition in the Visual System with Novel Views of 3D Objects", 2002, 2585-2596, 12 pages.

Swiercz, Waldemar, et al. "A new synaptic plasticity rule for networks of spiking neurons." Neural Networks, IEEE Transactions on 17.1 (2006) 94-105.

Voutsas, K. ; Adamy, J., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wade, J.J.; McDaid, L.J.; Santos, J.A.; Sayers, H.M., SWAT: A Spiking Neural Network Training Algorithm for Classification Problems, Neural Networks, IEEE Transactions on vol. 21 , Issue: 11 DOI: 10.11 09/TNN.2010.2074212, Publication Year: 2010, pp. 1817-1830.

Wennekers, T., Analysis of spatia-temporal patterns in associative networks of spiking neurons Artificial Neural Networks, 1999. ICANN 99. Ninth International Conference on (Conf. Publ. No. 470) vol. 1 DOI: 10.1049/cp:19991116 Publication Year: 1999, pp. 245-250, vol. 1.

Wu, QingXiang et al., Edge Detection Based on Spiking Neural Network Model, ICIC 2007, LNAI 4682, pp. 26-34, 2007, Springer-Verlag, Berlin Heidelberg.

Wu, QingXiang, et al. "Remembering Key Features of Visual Images based on Spike Timing Dependent Plasticity of Spiking Neurons." Image and Signal Processing, 2009. CISP '09, $2^{nd}$ International Congress on. IEEE. 2009.

\* cited by examiner

US 9,224,090 B2

SENSORY INPUT PROCESSING APPARATUS IN A SPIKING NEURAL NETWORK

CROSS-REFERENCE TO RELATED APPLICATIONS

This application is related to a co-owned U.S. patent application Ser. No. 13/465,924 entitled "SPIKING NEURAL NETWORK FEEDBACK APPARATUS AND METHODS", filed contemporaneously herewith on May 7, 2012, and a co-owned U.S. patent application Ser. No. 13/465,918 entitled "SPIKING NEURAL NETWORK OBJECT RECOGNITION APPARATUS AND METHODS", filed herewith on May 7, 2012, each of the foregoing incorporated herein by reference in its entirety. This application is also related to co-owned U.S. patent application Ser. No. 12/869,573 entitled "SYSTEMS AND METHODS FOR INVARIANT PULSE LATENCY CODING" filed Aug. 26, 2010, Ser. No. 12/869,583 entitled "INVARIANT PULSE LATENCY CODING SYSTEMS AND METHODS SYSTEMS AND METHODS" filed Aug. 26, 2010, Ser. No. 13/152,084 entitled "APPARATUS AND METHODS FOR PULSE-CODE INVARIANT OBJECT RECOGNITION" filed Jun. 2, 2011, Ser. No. 13/152,105 entitled "APPARATUS AND METHODS FOR TEMPORALLY PROXIMATE OBJECT RECOGNITION" filed Jun. 2, 2011, Ser. No. 13/152,119 entitled "SENSORY INPUT PROCESSING APPARATUS AND METHODS" filed Jun. 2, 2011, Ser. No. 13/117,048 entitled "APPARATUS AND METHODS FOR POLYCHRONOUS ENCODING AND MULTIPLEXING IN NEURONAL PROSTHETIC DEVICES" filed May 26, 2011, Ser. No. 13/239,259 entitled "APPARATUS AND METHOD FOR PARTIAL EVALUATION OF SYNAPTIC UPDATES BASED ON SYSTEM EVENTS" filed Sep. 21, 2011, Ser. No. 13/239,255 entitled "APPARATUS AND METHODS FOR SYNAPTIC UPDATE IN A PULSE-CODED NETWORK" filed Sep. 21, 2011, Ser. No. 13/314,066 entitled "NEURAL NETWORK APPARATUS AND METHODS FOR SIGNAL CONVERSION" filed Dec. 7, 2011, Ser. No. 13/239,123 entitled "ELEMENTARY NETWORK DESCRIPTION FOR NEUROMORPHIC SYSTEMS" filed Sep. 21, 2011, Ser. No. 13/239,148 entitled "ELEMENTARY NETWORK DESCRIPTION FOR EFFICIENT LINK BETWEEN NEURONAL MODELS AND NEUROMORPHIC SYSTEMS" filed Sep. 21, 2011, Ser. No. 13/239,155 entitled "ELEMENTARY NETWORK DESCRIPTION FOR EFFICIENT MEMORY MANAGEMENT IN NEUROMORPHIC SYSTEMS" filed Sep. 21, 2011, Ser. No. 13/239,163 entitled "ELEMENTARY NETWORK DESCRIPTION FOR EFFICIENT IMPLEMENTATION OF EVENT-TRIGGERED PLASTICITY RULES IN NEUROMORPHIC SYSTEMS" filed Sep. 21, 2011, Ser. No. 13/385,933 entitled "HIGH LEVEL NEUROMORPHIC NETWORK DESCRIPTION APPARATUS AND METHODS" filed Mar. 15, 2012, Ser. No. 13/385,938 entitled "TAG-BASED APPARATUS AND METHODS FOR NEURAL NETWORKS" filed Mar. 15, 2012, and Ser. No. 13/385,937 entitled "ROUND TRIP ENGINEERING APPARATUS AND METHODS FOR USE IN NEURAL NETWORK DESIGN" filed Mar. 15, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present innovation relates generally to artificial neural networks and more particularly in one exemplary aspect to computer apparatus and methods for efficient feedback implementation in a pulse-code neural network processing sensory input.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting discrete temporal events, typically on the order of 1-2 milliseconds (ms). Several exemplary embodiments of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

A typical artificial spiking neural network, such as the network 100 shown for example in FIG. 1, comprises a plurality of units (or nodes) 102, which correspond to neurons in a biological neural network. Any given unit 102 may be connected to many other units via connections 104, also referred to as communications channels, or synaptic connections. The units providing inputs to any given unit (e.g., the unit 102_2 in FIG. 1) are commonly referred to as the pre-synaptic units (e.g., the units 102_1 in FIG. 1), while the unit receiving the inputs (e.g., the unit 102_2 in FIG. 1) is referred to as the post-synaptic unit. Furthermore, the post-synaptic unit of one unit layer (e.g. the unit 102_2 in FIG. 1) can act as the pre-synaptic unit for the subsequent upper layer of units (e.g., the units 102_3 in FIG. 1).

Each of the unit-to-unit connections is assigned, inter alia, a connection efficacy, which in general refers to a magnitude and/or probability of input spike influence on neuronal response (i.e., output spike generation or firing), and may comprise, for example a parameter—synaptic weight—by which one or more state variables of post synaptic unit are changed). During operation of the pulse-code network (e.g., the network 100), synaptic weights are dynamically adjusted using what is referred to as the spike-timing dependent plasticity (STDP) in order to implement, among other things, network learning.

It is known from biology that networks in the brain exhibit significant feedback connectivity, which enables the higher processing areas to emphasize (or amplify) responses to features of interest in the pulse activity of lower processing areas. This process is typically referred to as "top-down attention modulation". A neural network operated using feedback would enhance some features relative to other features, thereby allowing for better allocation of computational resources of the upper hierarchical levels of the network. Feedback connections also enable the multistage spiking network to keep a stable representation of the features of the input and encode different aspects of the input in different stages of processing (e.g. the spatial position of an object in visual processing might be encoded in lower stages of processing, whereas higher order features or the identity of an object can be represented in the higher stages of processing). Feedback from higher levels into lower levels of the network hierarchy (e.g., from the units 102_1 to units 102_2 of FIG. 1) is beneficial for maintaining the integrity of such representation, since different aspects of the sensory input are often encoded by different parts of the network. Enhancing integrity of the pulse-coded representation also allows for error correction and filling information gaps based on the feedback context from the higher areas (e.g. contour or color filling).

While most existing implementations of sensory processing (e.g., computer vision) systems are purely feed-forward (see, for example, Thomas S. and Riesenhuber, M, 2004, Realistic Modeling of Simple and Complex Cell Tuning in the HMAX Model, and Implications for Invariant Object Recognition in Cortex, AI Memo 2004-017 July 2004, incorporated herein by reference in its entirety), which limits their processing capability, in some implementations that use simplified rate model neurons comprise feedback connections (see, for example, Revow M., Williams C., and Hinton, G. E., 1996, Using Generative Models for Handwritten Digit Recognition, IEEE Trans. on Pattern Analysis and Machine Intelligence, 18, No. 6, June 1996, incorporated herein by reference in its entirety), the problem of incorporating functional feedback in a spiking neural network processing of sensory input has not been solved.

Referring now to FIG. 2, the process of neuronal feedback in a spiking neural network 200 is illustrated. The post-synaptic neuron 202 receives inputs via synaptic connections 204 that correspond to a certain feed-forward input stimulus (e.g., output of simulated retinal ganglion cells in a visual spiking neural network). In addition to the stimuli signals 204, the neuron 202 receives feedback signals via the feedback connections 206. Typically, the feedback signal received by the post-synaptic neuron 202 is associated with the same context (as the feed-forward input stimulus signals), and is configured to increase probability of generating a post-synaptic spike (firing) by the neuron 202.

Such configuration, typically referred to as the positive feedback loop 220, is illustrated in more detail in FIG. 2A. Every time the neuron 202 generates a spike (fires) for a particular context C (e.g., a vertical bar in a visual field of the corresponding retinal ganglion cells), its output is transmitted over the synapse 226 to an adjacent neuron 222. The adjacent neuron 222 may comprise (with respect to the neuron 202) either a downstream neuron, or a lateral neuron, with respect to the neuron 202. Similarly, when the adjacent neuron 222 generates a spike (fires) a later time (but for the same context C), its output is provided (fed back) to the post-synaptic neuron 202 via the feedback synapse 206. As a result of the post-synaptic firing by the adjacent neuron 222, the synaptic weight 228 of the synapse 226 is increased (the synapse is potentiated). When the post-synaptic neuron 202 subsequently fires (for the same context C), the synaptic weight 210 of the synapse 206 is increased (the synapse is potentiated), thereby creating the positive feedback loop 220.

Such positive feedback configurations are invariably unstable, and result in a 'runaway' potentiation of synapses (e.g., the 210, 228 in FIG. 2A). As a result, presently available spiking neural networks that employ positive feedback are often unstable, characterized by uncontrolled spiking, seizures, and/or creation of hallucinatory responses.

Accordingly, there is a salient need for, inter alia, a feedback connection implementation that enables stable network operation, and enhances detection capabilities of the network, while eliminating runaway positive feedback loops.

SUMMARY OF THE INVENTION

The present invention satisfies the foregoing needs by providing, inter alia, apparatus and methods for implementing feedback in as spiking neural network.

In a first aspect of the invention, computer readable apparatus is disclosed. In one embodiment, the apparatus includes a storage medium having a plurality of instructions to implement adjustment of a connection of a spiking neuronal network, the instructions configured to, when executed: increase a weight associated with the connection based at least on a response generated by at least one neuron of the network prior to receipt of a signal indicative of a context; and reduce the weight based on the signal preceding the pulse. In one variant, the connection is configured to communicate the signal to the at least one neuron, and the reduction and the increase of the weight cooperate to effect control of context-based response generation by the at least one neuron.

In a second aspect of the invention, a computerized visual object recognition apparatus is disclosed. In one embodiment, the apparatus is configured for use a spiking neural network, and includes: a receiving module configured to receive visual input associated with an object, and to provide a stimulus signal, the stimulus signal configured based at least in part on the visual stream; a first spiking element configured to receive at least a portion of the stimulus, and to generate a response; and a second spiking element configured to receive at least a portion of the stimulus, and to provide a context signal to the first spiking element via a context connection. In one variant, the apparatus is configured to depress the context connection when the context signal precedes the response, and potentiate the context connection when the response precedes the context signal.

In a third aspect of the invention, a computerized sensory processing apparatus is disclosed. In one embodiment, the apparatus is configured for use in a spiking neural network, and includes: a spiking neuron configured to receive at least a portion of stimulus signal, and to generate a response; and a context connection configured to communicate a context signal to the neuron. In one variant, the apparatus is further configured to depress the context connection, based at least on part on the context signal preceding the response, thereby mitigating formation of positive feedback within a loop associated with the neuron.

In a fourth aspect of the invention, neuronal network logic is disclosed. In one embodiment, the neuronal network logic includes a series of computer program steps or instructions executed on a digital processor. In another embodiment, the logic comprises hardware logic (e.g., embodied in an ASIC or FPGA).

In a fifth aspect of the invention, a computer readable apparatus is disclosed. In one embodiment the apparatus includes a storage medium having at least one computer program stored thereon. The program is configured to, when executed, implement an artificial neuronal network.

In a sixth aspect of the invention, a system is disclosed. In one embodiment, the system comprises an artificial neuronal (e.g., spiking) network having a plurality of nodes associated therewith, and a controlled apparatus (e.g., robotic or prosthetic apparatus).

Further features of the present invention, its nature and various advantages will be more apparent from the accompanying drawings and the following detailed description.

Figure 1:
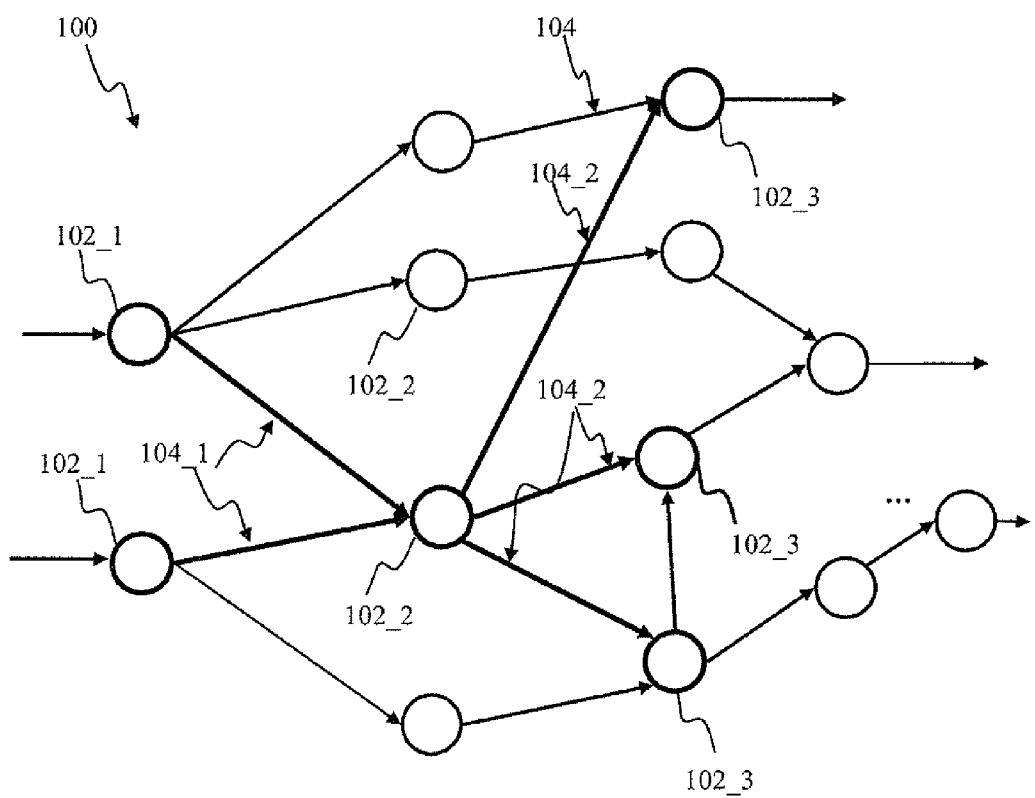
FIG. 1 is a block diagram depicting an artificial neural network comprising plurality of nodes and node connections according to the prior art.

All Figures disclosed herein are ©Copyright 2012 Brain Corporation. All rights reserved.

DETAILED DESCRIPTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present invention will be described, and detailed descriptions of other portions of such known components will be omitted so as not to obscure the invention.

In the present specification, an embodiment or implementation showing a singular component should not be considered limiting; rather, the invention is intended to encompass other embodiments or implementations including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", "wireless" means a causal link between any two or more entities (whether physical or logical/virtual), which enables information exchange between the entities.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "Wi-Fi" refers to, without limitation, any of the variants of IEEE-Std. 802.11 or related standards including 802.11a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

The present invention provides, in one salient aspect, methods for controlling context based feedback in spiking neural network processing sensory information. In one implementation of the invention, a spiking neuron receives feed-forward sensory input stimulus associated with an object (or event), and a feedback signal that correspond to the same object/event (i.e., has the same "context"). When the feed-forward input provides sufficient excitation/stimulation, the neuron generates a spike. In order to facilitate robust network operation, and avoid instabilities and runaway potentiation, a compensation mechanism is applied, such as e.g., an inverted spike-timing dependent plasticity (STDP) for feedback connections. The STDP reduces weights associated with the context (the connection is depressed) whenever the context signal precedes the spike (generated by the neuron). Conversely, whenever the spike generation by the neuron precedes the context signal, weights associated with the context are increased (the connection is potentiated). Such methodology ensures precise control or even elimination of feedback-induced firing (runaway positive feedback loop), enables self-stabilizing network operation, and allows control of seizure-type activity and hallucinatory responses.

In another aspect of the invention, context connection adjustment methodologies are used to implement robust context switching when processing visual sensory information using spiking neuronal networks. When a particular context (such an object feature) that was previously present in a visual input becomes unavailable to a particular neuron, prior potentiation of the context connection enables the neuron to continue firing for a predetermined period of time. If the feature remains absent, the context connection becomes depressed, thereby preventing the neuron from firing in the absence of the relevant feed-forward input. In another implementation, the weights of the context connections are adjusted to increase firing probability of their post-synaptic neurons.

In another implementation, portions of the object recognition apparatus are embodied in a remote computerized apparatus (e.g., server), comprising a computer readable apparatus.

Embodiments of object recognition functionality of the present invention are useful in a variety of applications including for instance a prosthetic device, autonomous robotic apparatus, and other electromechanical devices requiring visual data processing functionality.

Context Input with Inverted STDP

Detailed descriptions of the various embodiments and implementations of the apparatus and methods of the invention are now provided. Although certain aspects of the invention can best be understood in the context of the visual and sensory information processing using spiking neural networks, the invention is not so limited and embodiments of the invention may also be used in a wide variety of other applications, including for instance in implementing arbitrary feedback connections in pulse-code neural networks.

Embodiments of the invention may be for example deployed in a hardware and/or software implementation of a neuromorphic computer system. In one such implementation, a robotic system may include a processor embodied in an application specific integrated circuit, which can be adapted or configured for use in an embedded application (such as a prosthetic device).

Figure 3:
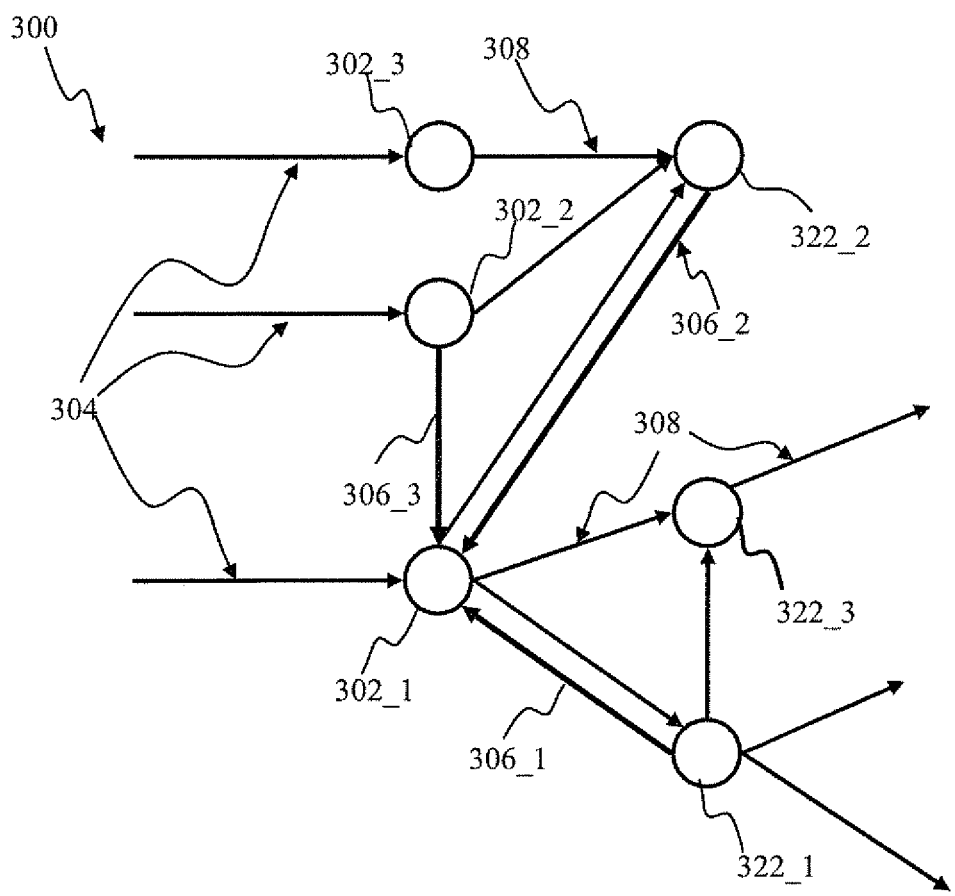
FIG. 3 is a graphical illustration of artificial neural network comprising context connections, in accordance with one or more implementations.

FIG. 3 illustrates one exemplary implementation of a spiking neuronal network of the invention, configured for processing of sensory information. The network 300 comprises a plurality of spiking neurons 302, 322 configured to receive input via channels 304, 308. In one approach, the channels 304 may carry feed-forward sensory input (pulses), which encode some aspects of the sensory input into different spike patterns.

The neurons 302, 322 are configured to generate spikes (such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety) which are propagated via feed-forward connections 308. Spike generation is well-established in the spiking network arts, and will not be described in detail for brevity and clarity of presentation of the inventive aspects of the present invention.

Contrasted with the prior art network 100 described with respect to FIG. 1, supra, the network 300 of FIG. 3 comprises feedback connections 306 that provide context input into neurons (e.g., the neuron 302 in FIG. 3). In some implementations, the feedback connections may originate from upper hierarchy (downstream) parts of the network (as depicted by, e.g., the feedback connections 306_1, 306_2 associated with the neurons 322_1, 322_2, respectively, in FIG. 3). In other implementations, the feedback may be provided from lateral parts of the network, as illustrated by the feedback connection 306_3 from the neuron 302_2 to the neuron 302_1 in FIG. 3.

Typically units (neurons) of each level of the network hierarchy receive feed-forward input, representing some information about the external world. As used herein, the terms "context", and "context feedback" are meant generally to denote, without limitation, any information that is not a part of the direct (feed-forward) input into a neural circuit. In some implementations, the feed-forward sensory input comprises retinal input via e.g., the connections 304 in FIG. 3. The feed-forward input can comprise signals provided by a lower level to an upper level of network hierarchy, as illustrated by the connections 308 in FIG. 3. Signals that are delivered via the feed-back connection (e.g., the connections 306 in FIG. 3) and are separate from feed-forward inputs are considered, in some implementations, as the context.

Figure 4:
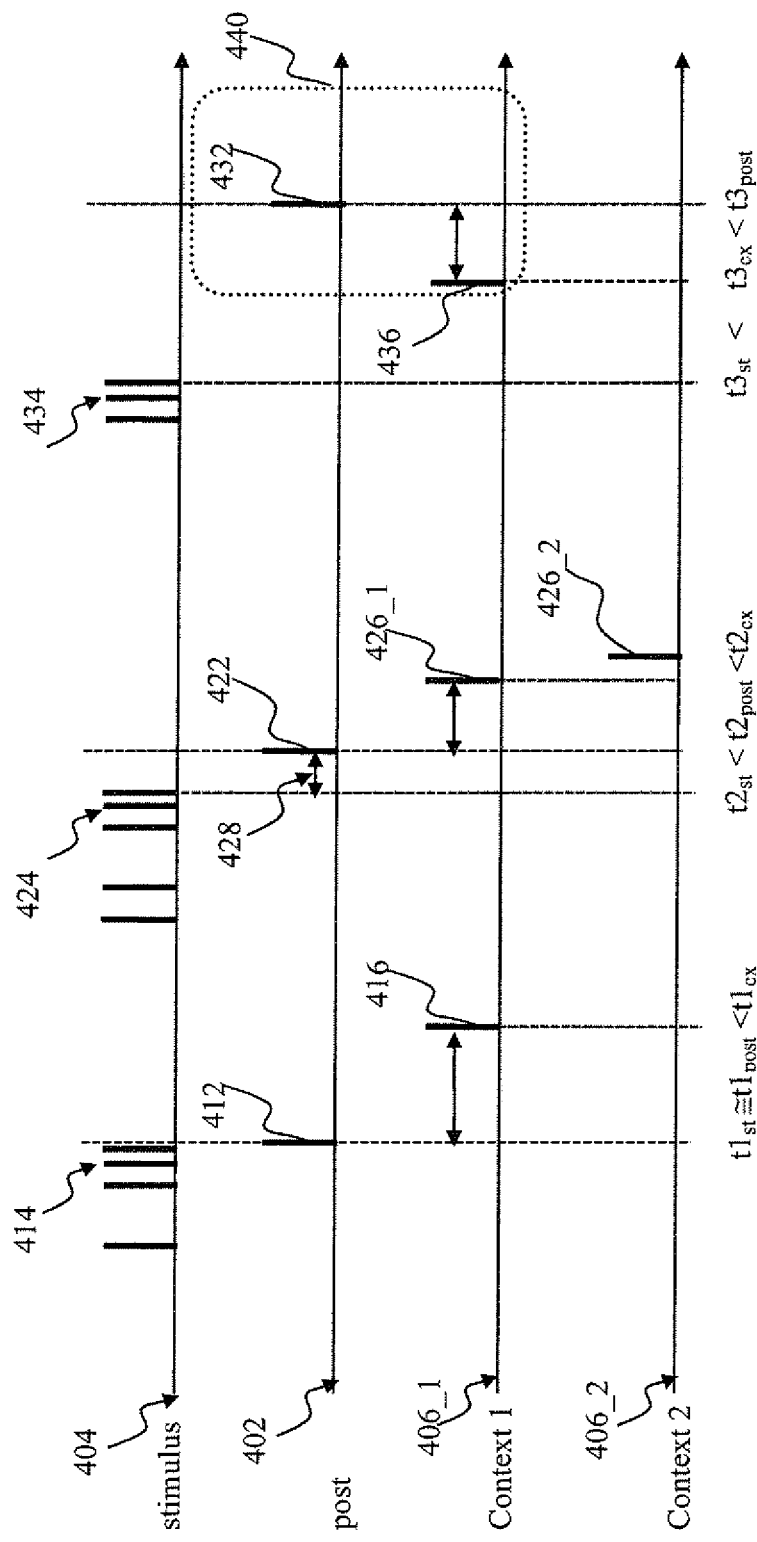
FIG. 4 is a graphical illustration of spike generation mechanism in response to a feed-forward stimulus input and context input, in accordance with one or more implementations.

FIG. 4 illustrates one example of spiking network operation (e.g., the network 300 of FIG. 3) according to one implementation of the invention. The traces denoted as 402, 404, 406 in FIG. 4 depict pulse patterns corresponding to the output of the neuron receiving feed-forward input, feed-forward input stimulus into the neuron, and context input into the neuron, respectively. In some applications, the context input 406 comprises a feedback signal provided from higher hierarchy neurons, as illustrated for example by the feedback connections 306_1, 306_2 of FIG. 3, and is referred to as the feedback input. In some implementations, this context or feedback input is provided from neighboring (lateral) neurons, as illustrated, for example by the connection 306_3 in FIG. 3.

The feed-forward stimulus input comprises of a pulse stream containing one or more pulse groups 414, 424, 434, corresponding to a particular aspect of the input. In some approaches, this aspect corresponds to an object (e.g., a rectangle) or object feature (e.g., an edge of the rectangle) as applied to visual data processing, or to a texture feature or sound parameter as applied to somatosensory and auditory data processing, respectively. Different input connections (e.g., the connections 304 in FIG. 3) may carry different aspects of the given input. Myriad other aspects useful with the present innovation will be recognized by those of ordinary skill given the present disclosure.

An input to a neuron may cause the neuron to generate (fire) a spike in which case the input is referred to as the 'super-threshold'. A weaker input may not evoke a response, in which case such input is referred to as the 'sub-threshold'. Those skilled in the art will recognize that the threshold may not be a fixed value. In some implementations of the neuronal model, the response-generating threshold may be dynamically changing and/or state dependent. For example, for multidimensional neural models, the firing threshold may correspond to a manifold in the phase space of the neuron. In one such variant, a particular input can either (i) evoke a spike depending on the history and state of the neuron; or (ii) adjust neuronal state without causing firing of the spike. For example, a class of neural models, referred to as resonators, exhibit intrinsic oscillations, as described in detail in Izhikevich, E. M. (2007) *Dynamical Systems in Neuroscience: The Geometry of Excitability and Bursting*, The MIT Press, 2007, incorporated herein by reference in its entirety. In the implementations of oscillatory or resonator neuronal models, even weak input, when applied at a resonant frequency of the neuron, may evoke spiking response, while other inputs (even greater in magnitude, but applied out of phase and/or at a wrong frequency) may not evoke post synaptic responses.

When the feed-forward stimulus input (i.e., the pulses of the pulse groups 414, 424 in FIG. 4) moves the state of post-synaptic neuron (e.g., the neuron 302 in FIG. 3) above its firing threshold, the neuron generates a pulse, as illustrated by the pulses denoted as 412, 422 in FIG. 4. In some implementations, generation of the post-synaptic pulse may occur immediately upon receipt of the relevant feed-forward stimulus, as indicated by the pulse 412, where the post-synaptic pulse generation time $t1_{post}$ is approximately equal to feed-forward stimulus receipt time $t1_{st}$ in FIG. 4.

In some implementations, generation of the post-synaptic pulse may occur after a delay 428 (typically between 1 ms and 50 ms) after the receipt of the relevant feed-forward stimulus. As shown in FIG. 4, the pulse 422 occurs a delay 428 after the receipt of the last pulse in the stimulus group 424, so that $t2_{post} > t2_{st}$.

When the feed-forward stimulus input is not sufficient to cause the neuron to move to the super-threshold state, the neuron does not generate the output, as illustrated by the absence of the post synaptic pulse subsequent to the receipt of the pulse group 434 in FIG. 4. As previously noted, in certain implementations, other actions may be taken with respect to the post-synaptic neuron even if it does not meet the firing threshold.

Referring back to FIG. 3, the neuron 322_2 may respond for one or more different aspects of the input compared, for example, to the neuron 302_1. These aspects may, however, be related (e.g. that co-occur, or occur with fixed delay one after the other). In this case, firing of the neuron 322_2 provides a relevant context to firing of the neuron 302_1, and is delivered via a feedback connection 306_2.

Similarly, the context input 406 in FIG. 4 is configured to supplement the feed-forward stimulus input (the input 404 in FIG. 4), and to aid the neuron in generating post-synaptic responses for the right context. The context information communicated via the channels 406 may be associated with the feed-forward stimulus input, whose one aspect may have been encoded in the pulse sequence 414 of the trace 404 in FIG. 4.

When the context input (illustrated by the pulse 436 on the context 1 trace 406_1 in FIG. 4) arrives at the neuron (e.g., the neuron 302 in FIG. 3), its effect moves the neuron past the firing threshold, causing generation of the post-synaptic output 432.

Contrasted with the post-synaptic pulses 412, 422, which are generated prior to the receipt of the corresponding context pulses 416, 426 respectively, the post-synaptic pulse 432 is generated after the receipt of the context input (the pulse 436), so that context pulse time $t3_{cx} < t3_{post}$, as shown in FIG. 4. The post-synaptic firing that is triggered by the context input is referred herein to as the context-based firing, and is denoted by the dashed curve 440 in FIG. 4.

Figure 5:
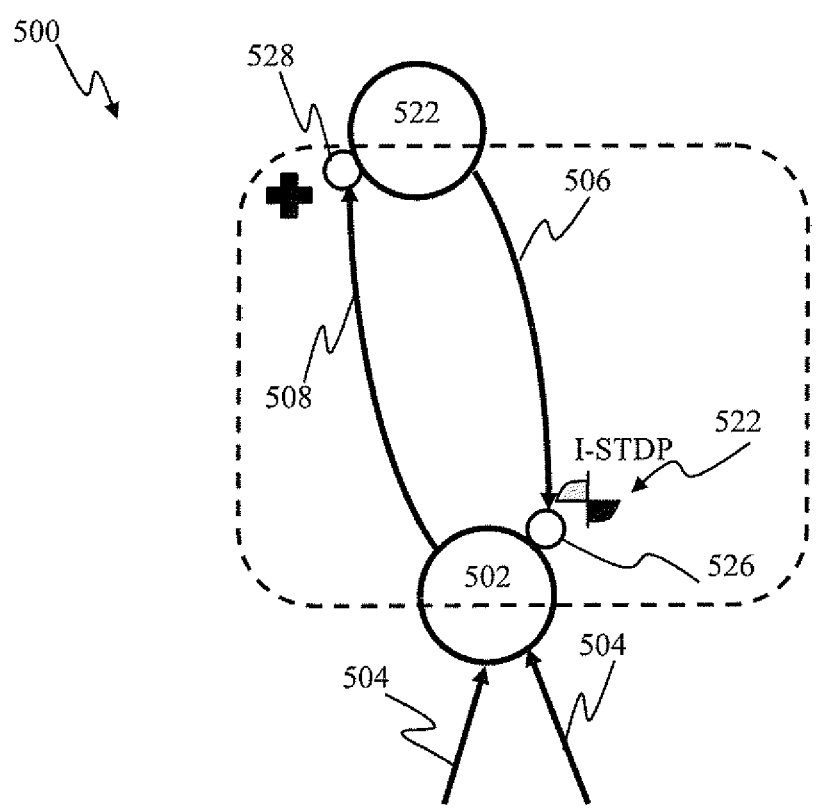
FIG. 5 is a graphical illustration depicting spiking network comprising context feedback, in accordance with one implementation.

Referring now to FIG. 5, one exemplary implementation of context feedback for use with the spiking network (e.g., the network 300 of FIG. 3) is shown and described in detail. The feedback block 500 comprises the neuron 502 receiving feed-forward sensory input signals via connection 504. The neuron 502 may provide pulses to one other neuron 522 via the feed-forward connection 508. The connection 508 is characterized by a weight, depicted by the circle 528 in FIG. 5. The neuron 502 receives feed-forward sensory stimulus, via the input connections 504, and context input, via the feedback connection 506. The feedback connection is also characterized by a connection weight 526. The context information communicated via the feedback connections to the neuron 502 (such as the connections 506 in FIG. 5) is associated with the same sensory context as the inputs, delivered over the connections 504 in FIG. 5.

Figure 2:
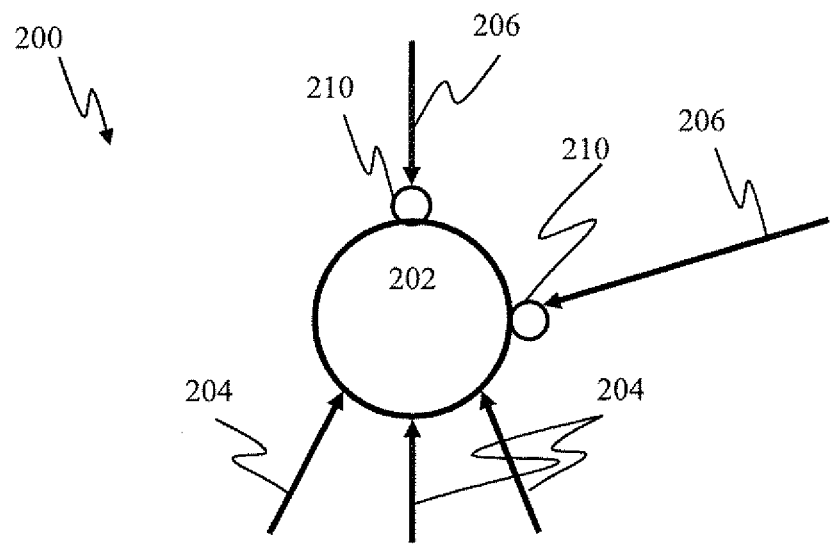
FIG. 2 is a block diagram depicting one synaptic feedback mechanism in an artificial neural network according to the prior art.
Figure 2A:
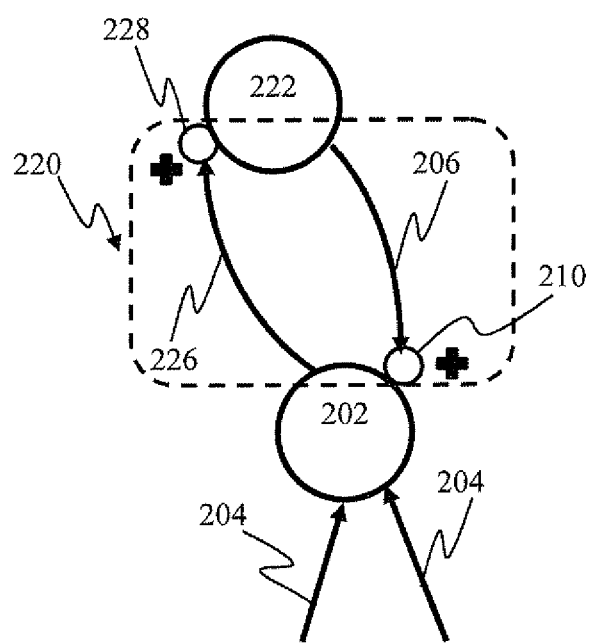
FIG. 2A is a graphical illustration depicting positive feedback loop associated with the synaptic feedback mechanism of FIG. 2.

In order to prevent origination of runaway positive feedback loops described with respect to FIG. 2 supra, and to achieve stable network operation, the feedback connection of the illustrated implementation 506 comprises an inverse STDP (I-STDP) block 522 that is applied to adjust the connection weight 526.

Figure 6:
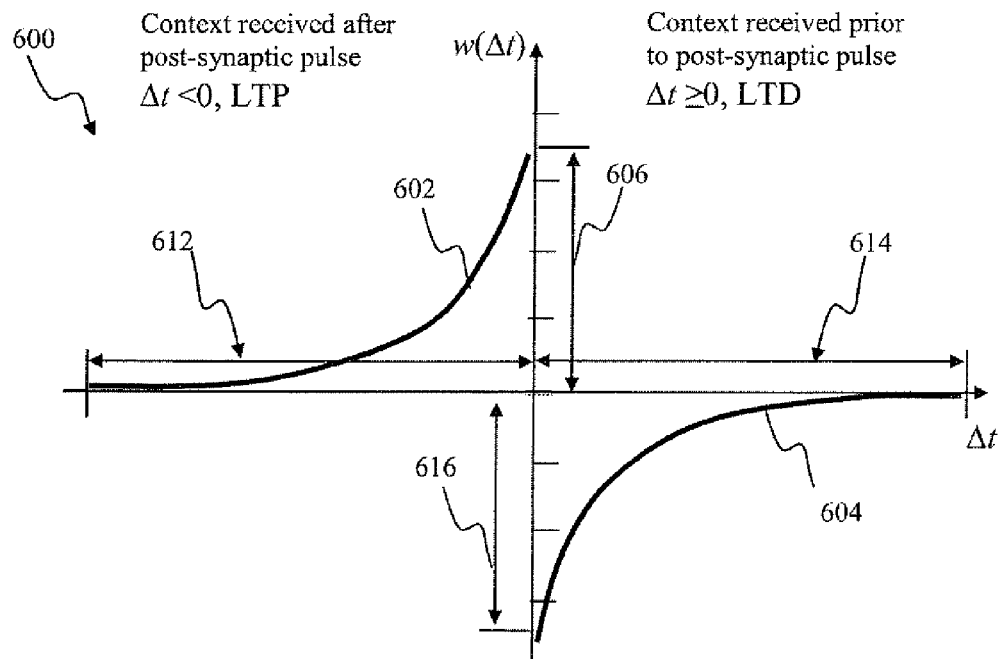
FIG. 6 is a plot illustrating inverted spike-time dependent plasticity rules useful with the context connection update mechanism of FIG. 5 in accordance with one or more implementations.

One exemplary implementation of such I-STDP feedback connection weight adjustment is shown and described with respect to FIG. 6. The curves 602, 604 in FIG. 6 depict the change in synaptic weight Δw of the context connection (e.g., the connection 506 in FIG. 5), as a function of a time interval Δt between the time of generation of the output pulse $T_{post}$ and the receipt/arrival of the context input $T_{cx}$ by the neuron (e.g., the neuron 502 in FIG. 5). Hence, $\Delta t = T_{post} - T_{cx}$. When the context input is received by the neuron prior to (or coincident with) the output pulse, the time interval Δt is positive, and the weight is reduced according to a prescribed function (e.g., the curve 606 in FIG. 6). Conversely, when the context input is received by the neuron after the generation of the output pulse, Δt is negative, and the connection weight is increased in accordance with a prescribed function (e.g., the curve 602).

Figure 6A:
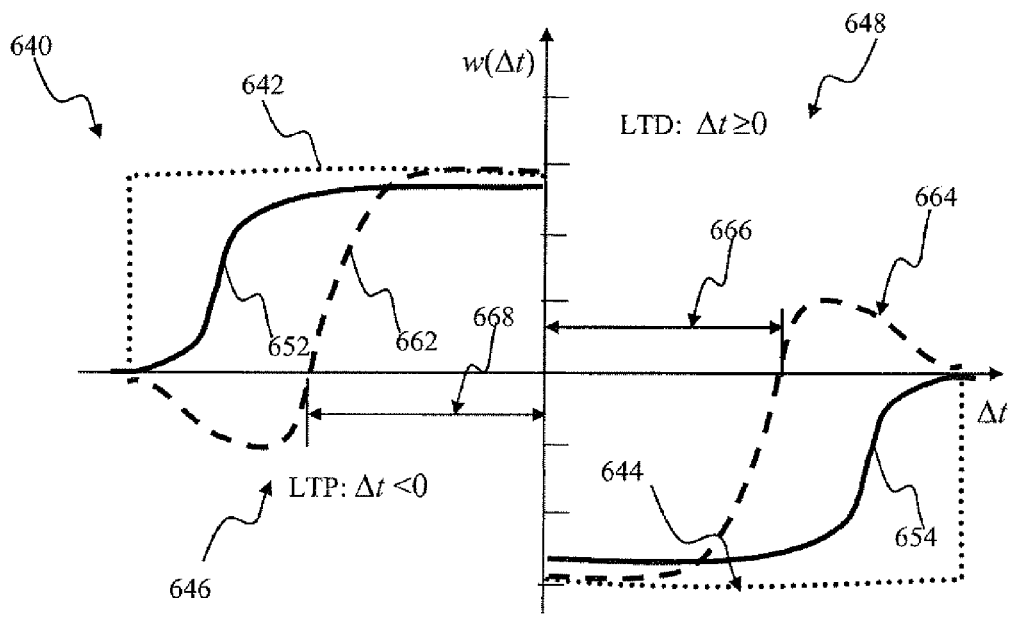
FIG. 6A is a plot illustrating additional inverted spike-time dependent plasticity rules useful with the context connection update mechanism of FIG. 5 in accordance with one or more implementations.

Various other I-STDP implementations can be used with the invention, such as, for example, the rules comprising curves 642, 644, curves 652, 654, and curves 662, 664, as illustrated in FIG. 6A. It will be appreciated by those skilled in the arts that other plasticity curves (or yet other types of relationships) may be used with the approach of the disclosure, including for example non-symmetric rules (e.g., composed of the curves 642, 654 of FIG. 6A), which comply with the following constraints:

$$w_{LTP} = (\int_{-\infty}^{0} w(\Delta t) dm(\Delta t)) > 0, \quad\quad\quad \text{(Eqn. 1)}$$

$$w_{LTD} = (\int_{0}^{\infty} w(\Delta t) dm(\Delta t)) < 0, \quad\quad\quad \text{(Eqn. 2)}$$

where m(Δt) is a measure of inter spike interval frequency. That is, m(Δt) describes a probability that in a given spiking network the interval between consecutive pre-synaptic and output spikes is Δt. In some implementations, the parameter m(Δt) may decay to zero as Δt increases, such that integrals (Eqn. 1) and (Eqn. 2) always exist and are finite even if w(Δt) is not Lebesgue integrable (as for example the curves 622, 624, 632, 634 in FIG. 6B, below). The relevant time interval $T_1, T_2$ is then defined in terms of m(Δt) such as the intervals which correspond to a 95% probability that the parameter Δt is between and $T_1, T_2$. If for example the firing of neurons in a spiking neural network is modeled as an independent Poisson process, then:

$$m(\Delta t) \sim \exp(-|\alpha \Delta t|), \quad\quad\quad \text{(Eqn. 3)}$$

where α depends on rates of the Poisson processes. In other words, the I-STDP rule for the feedback connection is selected such that an integral with respect to the inter-spike integral measure m(Δt) over the LTP window (denoted with the arrow 646 in FIG. 6A) is positive and an integral over the LTD window (denoted with the arrow 648 in FIG. 6A) is negative.

The weight w adjustment implementation shown in FIG. 6 is characterized by the maximum adjustment amplitudes A1, A2 denoted by the arrows 606, 616, respectively. While in the implementation shown in FIG. 6 the weight adjustment magnitude Δw diminishes and approaches zero as the |Δt| increases, in other implementations (e.g., the STDP rule 620 shown in FIG. 6B), one side of STDP curve (e.g., the curve 622) converges to a constant non-zero value 628, so that over an extended time horizon, the rule becomes "spike timing independent plasticity", for example providing a constant "up-drift" related to pre-synaptic activity. In another exemplary implementation (shown in FIG. 6B), both the pre-synaptic curve 632 and the post-synaptic curve 634 of the STDP rule 630 converge to non-zero levels 638, 636 respectively. As will be appreciated by those skilled in the arts, various other implementations of STDP rules (or yet other types of rules) may be used consistent with the invention, provided that the necessary conditions (such as e.g., those of Eqns. 1-2) are met.

Figure 6B:
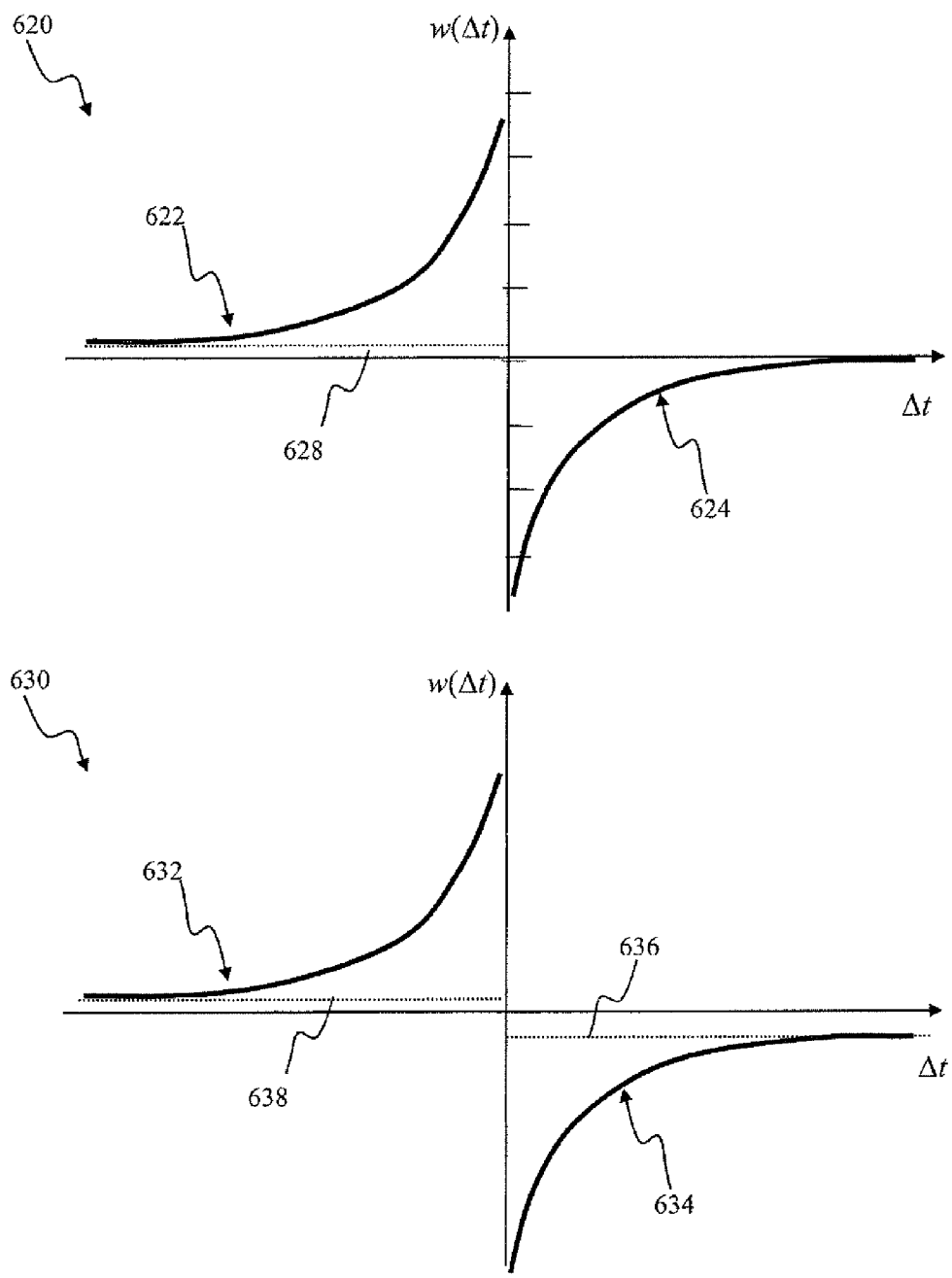
FIG. 6B is a plot illustrating asymmetric inverted spike-time dependent plasticity rules useful with the context connection update mechanism of FIG. 5 in accordance with one or more implementations.

The cumulative effect of the curves 602, 622, 632 of FIGS. 6-6B is "long-term" potentiation of the synaptic weights (LTP), and the cumulative effect of the curves 604, 624, 634 of FIGS. 6-6B is long-term depression of the synaptic weights (LTD). As used herein, the term "long term" simply refers to a time frame consistent with a desired responsiveness of the system (e.g., so as to avoid runaway or short-term potentiation or depression). For example, the exemplary LTP and the LTD adjustments are characterized by plasticity windows $T_1$, $T_2$, denoted by the arrows marked as 612, 614, respectively, in FIG. 6. In some implementations, plasticity window lengths are selected to correspond to relevant neuronal dynamic time scales (e.g., the timescale of synaptic conductance decay or the timescale of refraction). In some implementations, the windows $T_1, T_2$ are configured in the range between 1 and 100 ms, preferably, 40 ms in width. In other implementations (not shown), the plasticity windows $T_1, T_2$ may be quite long, reaching for example several seconds. Overall, the STDP curves compatible with the invention should preferably cause substantial variations of the weight adjustment $\Delta w$ near $\Delta t=0$.

As will be appreciated by those skilled in the arts given the disclosure, the terms "connection potentiation" and "connection depression" are used to describe the overall (i.e., integral) effect of the STDP rule on the connection weight adjustment, in accordance with Eqn. 1 and Eqn. 2. However, a bi-polar STDP rule (e.g., the curve 664 in FIG. 6A) may cause depression or potentiation, depending on whether the $\Delta t$ falls within or outside the depression window, denoted by the arrow 666 in FIG. 6A. Conversely, the bipolar potentiation rule (the curve 662 in FIG. 6A) may cause potentiation or depression, depending on whether the $\Delta t$ falls within or outside the potentiation window, denoted by the arrow 668 in FIG. 6A. Hence, the overall effect of the potentiation and depression curves (e.g., the curves 666, 668) of the STDP may also be referred to as the "post-rule" and "the pre-rule" of the STDP.

Figure 7:
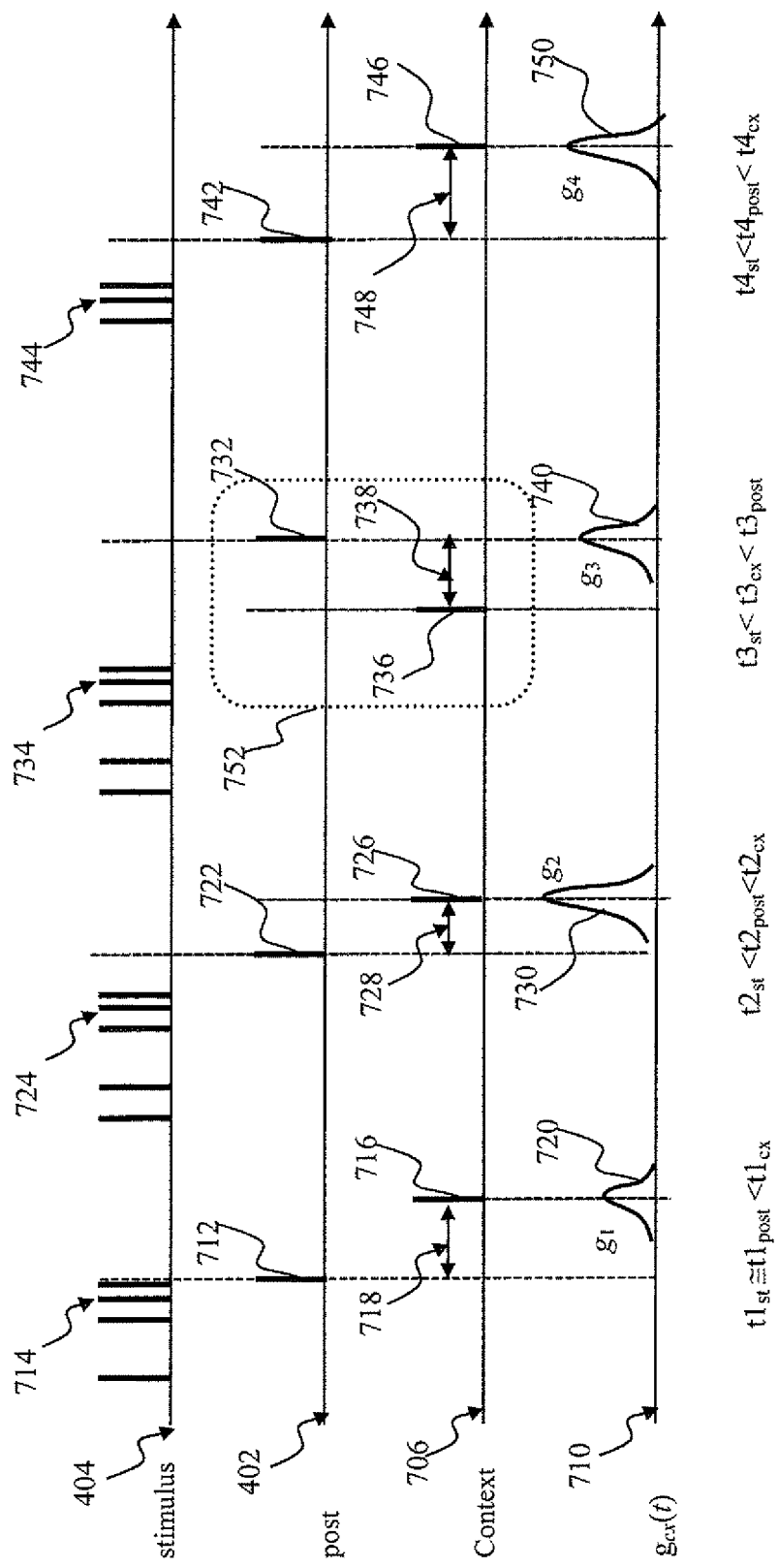
FIG. 7 is a graphical illustration depicting an inverted STDP adjustment mechanism used for response generation in response to a feed-forward stimulus input and context input, according to one or more implementations.

FIG. 7 illustrates one example of a spiking network implementation using a feedback connection I-STDP, configured according to the invention. Similarly to the network described with respect to FIG. 4, supra, the traces denoted as 402, 404, 706 in FIG. 7 depict pulse patterns corresponding to the output of the neuron, feed-forward input stimulus into the neuron, and input context into the neuron, respectively.

The feed-forward stimulus input comprises of a pulse stream comprising one or more pulse groups 714, 724, 734, 744, corresponding to a particular input aspect. When the stimulus input (i.e., the pulses of the pulse groups 714, 724, 744 in FIG. 7) is sufficient to move the state of neuron (e.g., the neuron 502 in FIG. 5) above its firing threshold, the output pulse is generated, as illustrated by the pulses denoted as 712, 722, 742 in FIG. 7.

When the feed-forward input stimulus is not sufficient to move the state of the output neuron above its firing threshold, the neuron does not generate the post synaptic pulse, (as illustrated by the absence of the pulse on trace 402 subsequent to the receipt of the pulse group 734 in FIG. 4). For that pulse group, the output pulse 732 is generated responsive to the context signal (the context pulse 736 on trace 706), and is referred to as the context-induced firing, denoted by the broken curve 752 in FIG. 7.

The trace 710 in FIG. 7 illustrates the contribution g(t) to the dynamic state (e.g., the membrane voltage v(t)) of the neuron, responsive to the connection weight adjustment associated with the context trace 706. The curves 720, 730, 740, 750 denote state variable corresponding to the context pulses 716, 726, 736, 746 in FIG. 7, respectively. The maximum state contribution magnitudes are denoted with $g_1, g_2, g_3, g_4$, respectively, in FIG. 7. The time intervals between the post synaptic pulses and the respective context inputs are denoted by arrows 718, 728, 738, 748, respectively. The weights of the context connection (e.g., the connection 508 in FIG. 5) are adjusted in this exemplary implementation using the inverse-STDP approach described with respect to FIGS. 6-6B, supra.

When the output pulses are generated prior to the receipt of the context inputs, as illustrated by the pulses 716, 726, 746 in FIG. 7, respectively, the corresponding time intervals $\Delta t$ 718, 728, 748 are negative, and the context connection weight is increased (the context connection is potentiated). As described in more detail below, potentiated connections result in a more excitable neuronal state as illustrated in FIG. 7 by the curve 730 having higher amplitude than the curve 720, and the curve 750 having higher amplitude than the curve 740 ($g_4 > g_3$, $g_2 > g_1$). In some approaches, corresponding for example to the plasticity rules 602, 642 of FIGS. 6 and 6A, respectively, a smaller interval $\Delta t$ between the output pulse and the context input results in a larger weight increase (stronger potentiation). This is illustrated by larger amplitude increase for the curve 730, relative to the curve 720, as compared to the amplitude increase for the curve 740, relative to the curve 730, as the interval 728 is smaller compared to the interval 748 in FIG. 7.

When the context input pulses are received before the output pulses are generated, as illustrated by the pulse 736 in FIG. 7, the corresponding time interval $\Delta t$ 738 is positive, and the context connection weights are decreased (the connection is depressed). This is depicted by the curve 740 having lower amplitude than the preceding curve 730 ($g_3 < g_2$) in FIG. 7.

It is noted that while the connection contribution change g(t) (e.g., the contribution 730) due to connection potentiation/depression is determined based on the output pulse (the pulse 722) firing, and the context pulse (the pulse 726) receipt firing potentiates the weight, the change in neuronal state (e.g., the voltage v(t)) will only be seen when the next output pulse (e.g., the pulse 732) is generated.

In some implementations, the node (e.g., the node 502 of FIG. 5) does not receive the context signal (or the context signal arrives in such timing to firing of post synaptic cell), such that the corresponding $\Delta t$ corresponds to a value of zero of the inverted STDP curve, and the weight of the context connection remains unchanged (not shown).

Synaptic connection potentiation/depression invariably affects the dynamic state of the respective neuron, as described in detail, for example, in U.S. patent application Ser. No. 13/152,105 entitled "APPARATUS AND METHODS FOR TEMPORALLY PROXIMATE OBJECT RECOGNITION", incorporated by reference, supra. As described in the above mentioned application, dynamic behavior of the spiking neuron is in exemplary implementations described using a state equation, comprising a state variable v(t). The neuron response is determined based on the condition that $v \in S$ or some set S. The synaptic inputs arriving at the neuron (the feed-forward stimulus and the context) depolarize the neuron (that is, push the neuron state towards the set target state S), thereby increasing the probability of generating the output by the neuron. When the neuron is sufficiently depolarized (i.e., its state corresponds to the target state), the neuron fires (generates the output) and is reset.

In some implementations of the present disclosure, the neuronal state variables may comprise:
  v—simulated membrane voltage; and
  u—recovery parameter.

In other implementations of the disclosure, the state of the neuron comprises a vector $\{v, u, u_1, \ldots, u_n\}$, where v is the variable that simulates the membrane voltage, and $u, u_1, \ldots u_n$ are additional state variables, configured in accordance with the specific model (dynamic or stochastic) of the neuron.

In some implementations, the additional neuronal parameters comprise synaptic conductance (e.g., gAMPA, gGABA_A, gGABA_B, gNMDA, etc.) configured to describe a particular transmitter/receptor of a biological neuron.

The neuron dynamic state may also be described as a dynamical system with two (or more) dimensions. This dynamical system is typically characterized by an excitable regime, meaning that in the absence of perturbation, the system stays at an equilibrium point, but given enough input (stimulus) it can rapidly transition to an excited state (the target state). This transition corresponds to a rapid change of the state parameter values (e.g., membrane voltage v) thereby producing a transient event, referred to as the spike. In one approach, the neuron can be described by the following system:

$$\frac{dv}{dt} = F(u,v) + gAMPA(E\_AMPA - V) + gGABA\_A(E\_GABA - V) \quad \text{(Eqn. 4)}$$

$$\frac{du}{dt} = G(u,v) \quad \text{(Eqn. 5)}$$

where F (u,v) and G(u,v) are functions determining the phase portrait of a neuron. Typically, the resting state of biological neurons corresponds to the resting voltage of v0=−65 mV, but in some implementations the voltages and other variables can be resealed to arbitrary or normalized units.

The inputs (synapses) usually act on the neuronal state by increasing the values of a particular conductance or conductances (for example, a synapse triggered by a pre-synaptic spike increments the post-synaptic gAMPA by the appropriate synaptic weight w).

The reverse potential (e.g. E_AMPA) determines whether the increased conductance increases or decreases the value of voltage. For example, if E_AMPA=0, then at v0=−65 mV increased gAMPA results in a positive contribution of 65×gAMPA, thereby increasing probability of spike generation.

When the reverse potential is below the resting state (e.g., E_GABA_A=−70 mV), then the respective term in Eqn. 4 is negative, thereby decreasing the likelihood of the spike generation. Such conductance/synapses are referred to as "inhibitory" (in contrast to "excitatory" ones, which have the opposite effect).

In some implementations, individual contributions from multiple synapse inputs $g_i(t)$ to the overall excitability of the neuron g(t) are added as follows:

$$g(t) = \Sigma_i g_i(t) \quad \text{(Eqn. 6)}$$

Typically, the synaptic conductance decays with time and, in some approaches, is approximated using exponential decay as follows:

$$\frac{d(gAMPA)}{dt} = -\frac{gAMPA}{\tau 1}, \frac{d(gGABA)}{dt} = -\frac{gGABA}{\tau 2}, \quad \text{(Eqn. 7)}$$

$$\frac{d(gNMDA)}{dt} = -\frac{gNMDA}{\tau 3}.$$

where τ1 is about 5 ms, while τ2, τ3 may reach up to 200 ms.

In some implementations, the synaptic effect on the neuron could be an instantaneous pulse (increment) applied directly to a membrane voltage or another state variable.

Figure 15B:
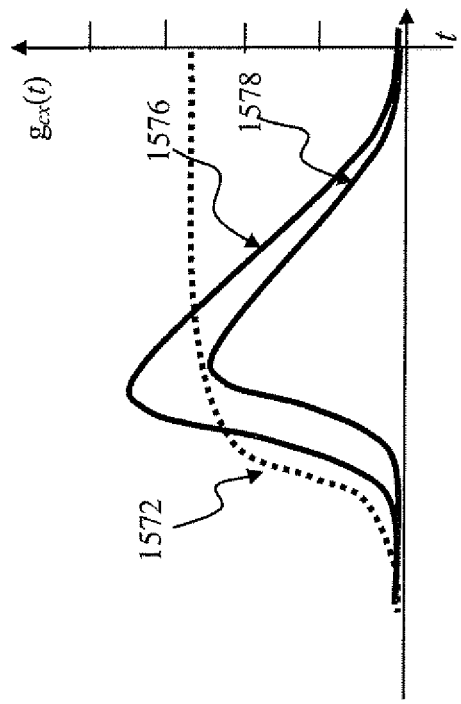
FIG. 15B is a plot depicting context connection potentiation of the mechanism of FIG. 7, according to some implementations.
Figure 15A:
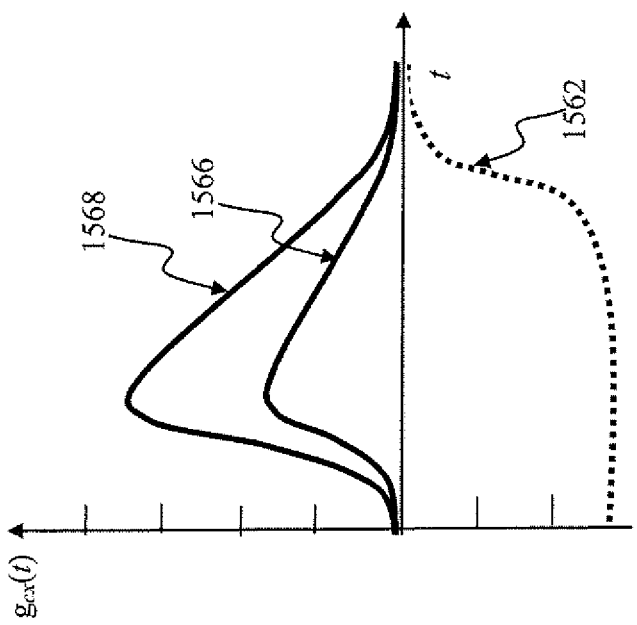
FIG. 15A is a plot illustrating depression of the context connection of mechanism of FIG. 7, according to some implementations.

Exemplary effects of context connection potentiation and depression are illustrated in more detail in FIGS. 15A-15D. Curves 1568, 1566 in FIG. 15A illustrate decreased excitability of the neuron due to depression of the context connection (given by the curve 1562). The contribution of the context connection $g_{cx}(t)$ to the neuronal dynamic state (as described, for example, by the membrane voltage v(t) Eqn. 4) prior to the context connection depression is given by the curve 1568 in FIG. 15A. Connection depression causes a decreased contribution to the neuron excitability as illustrated by the curve 1566 in FIG. 15A, which may result in a lower membrane voltage profile v(t).

Conversely, FIG. 15B illustrates an increased excitability of the neuron due to potentiation of the context connection (given by the curve 1572 in FIG. 15B). The contribution of the context connection $g_{cx}(t)$ to the neuronal dynamic state prior to the context connection potentiation is given by the curve 1578. Potentiation of the context connection causes greater contribution to neuron excitability, illustrated by the curve 1576 in FIG. 15B, and may produce higher membrane voltage profile.

Figure 15C:
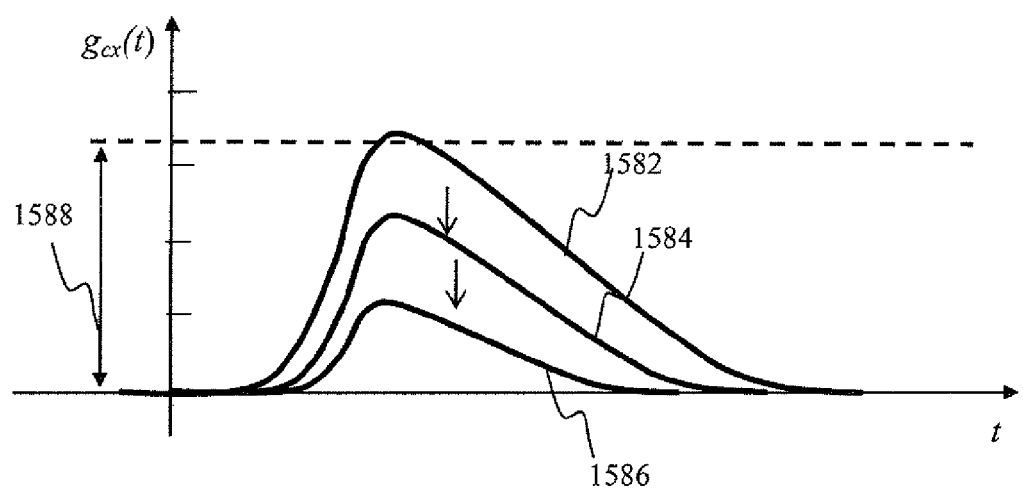
FIG. 15C is a plot depicting decreased neuronal excitability due to depression of the context connection mechanism of FIG. 7, according to some implementations.

FIG. 15C illustrates reduced neuron excitability as a result of the context-induced firing (e.g., the pulse configuration 752 of FIG. 7). When the feed-forward input stimulus is not sufficient (and the neuron fires based primarily on the context input), the context connection is progressively depressed, as described above with respect to, for example, FIGS. 6A and 7. Hence, the contribution of the context connection $g_{cx}(t)$ to the overall excitability of the neuron is reduced, as illustrated by the progressively lower amplitude of the curves 1582, 1584, 1586 in FIG. 15C. This reduced contribution may cause the neuronal state to move further away from the firing threshold, depicted by the broken line 1588 in FIG. 15C), thereby reducing probability of output spike generation for subsequent inputs.

Figure 15D:
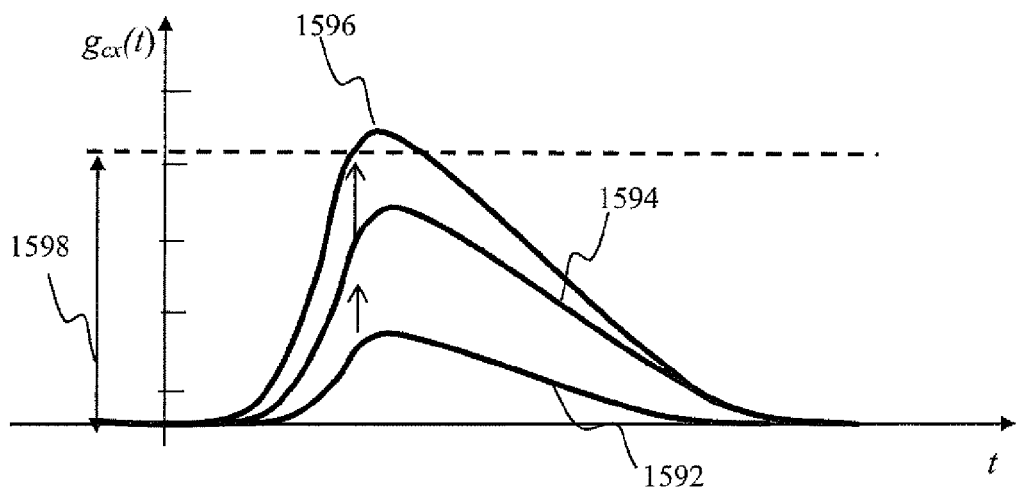
FIG. 15D is a plot depicting increased neuronal excitability due to potentiation of the context connection mechanism of FIG. 7, according to some implementations.

Similarly, FIG. 15D illustrates increased neuron excitability due to a potentiated context connection. Each time the context input is received after the output spike has been generated, the context connection is progressively potentiated, as described with respect to FIGS. 6A and 7 supra. Accordingly, the contribution of the context connection $g_{cx}(t)$ to the overall excitability of the neuron is increased, as illustrated by the progressively larger amplitude of the curves 1592, 1594, 1596 in FIG. 15D. In some implementations, this increased contribution may cause the neuronal state to move past the firing threshold (depicted by the broken line 1598 in FIG. 15D), thereby increasing the probability of spike generation by the neuron for subsequent inputs.

Exemplary Methods

Exemplary implementations of the methodology described herein advantageously enable, inter alia, stable network operation, and eliminate runaway positive feedback loops and uncontrolled spiking.

Control of Context-Aided Neuronal Response

Figure 8:
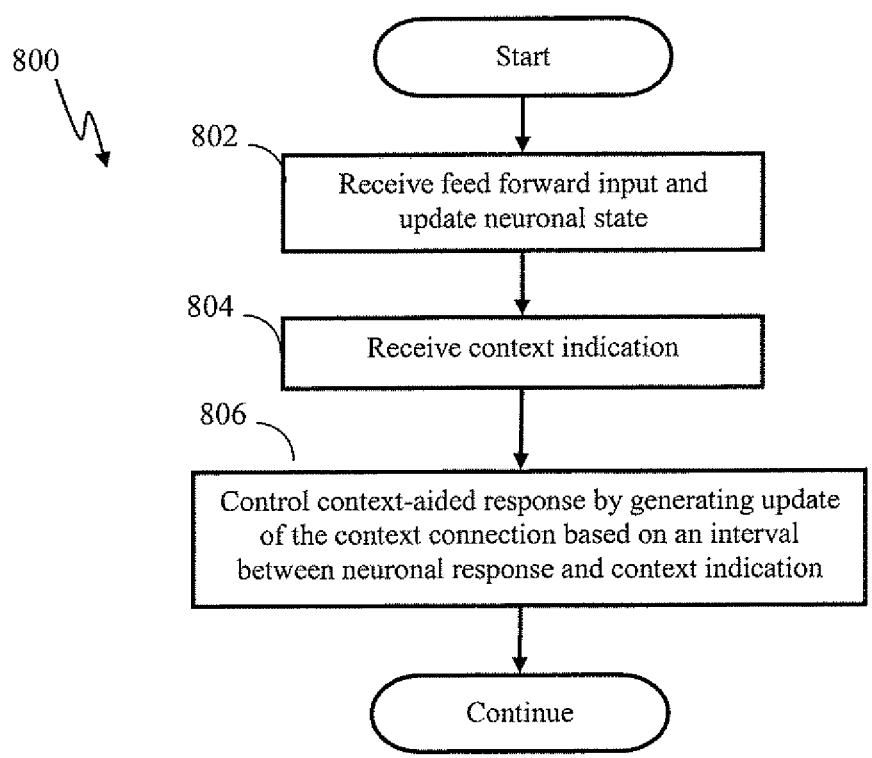
FIG. 8 is a logical flow diagram illustrating control of context-aided neuronal response, in accordance with one or more implementations.
Figure 8A:
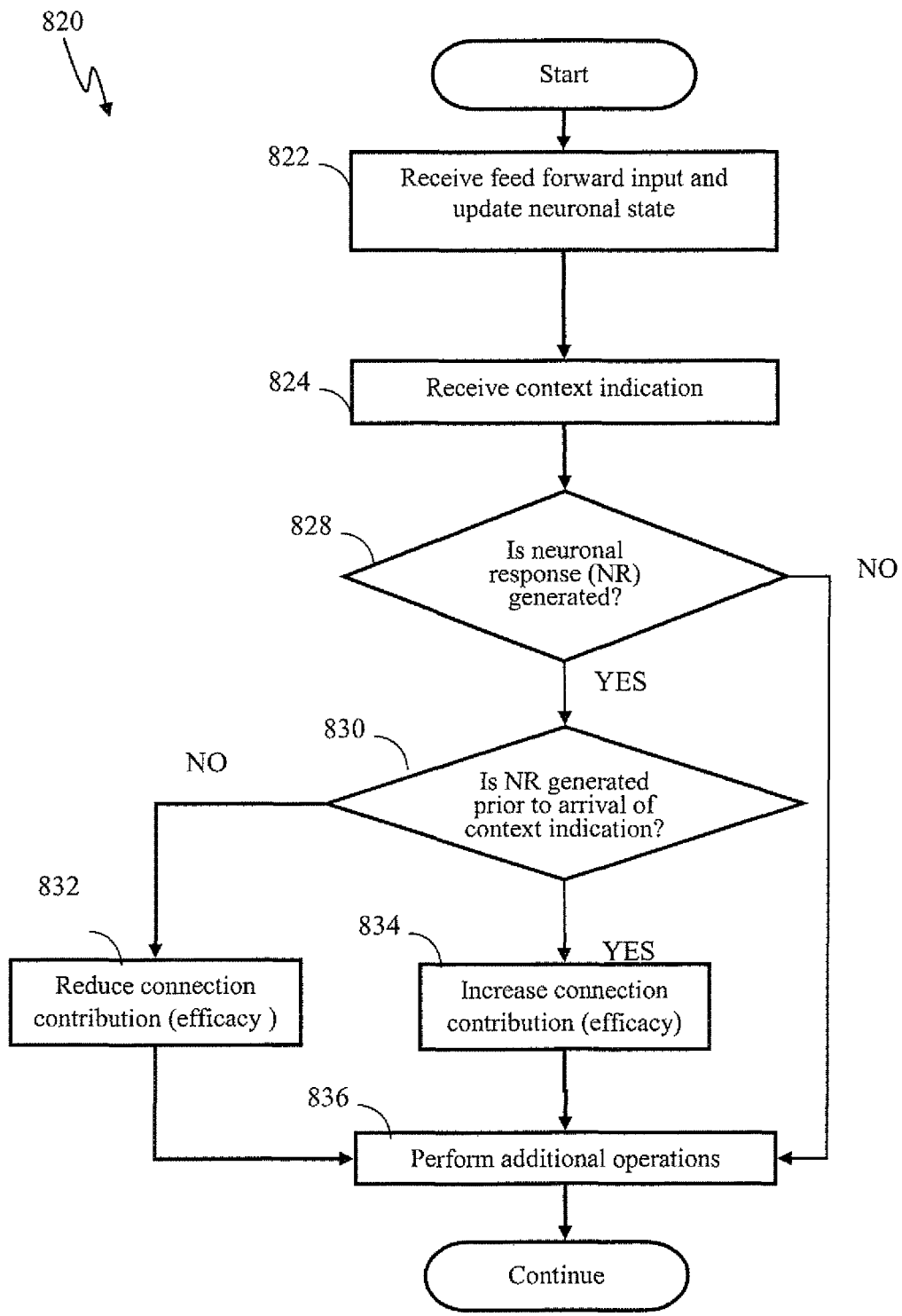
FIG. 8A is a logical flow diagram illustrating control of context-aided neuronal response, in accordance with one or more implementations.
Figure 8B:
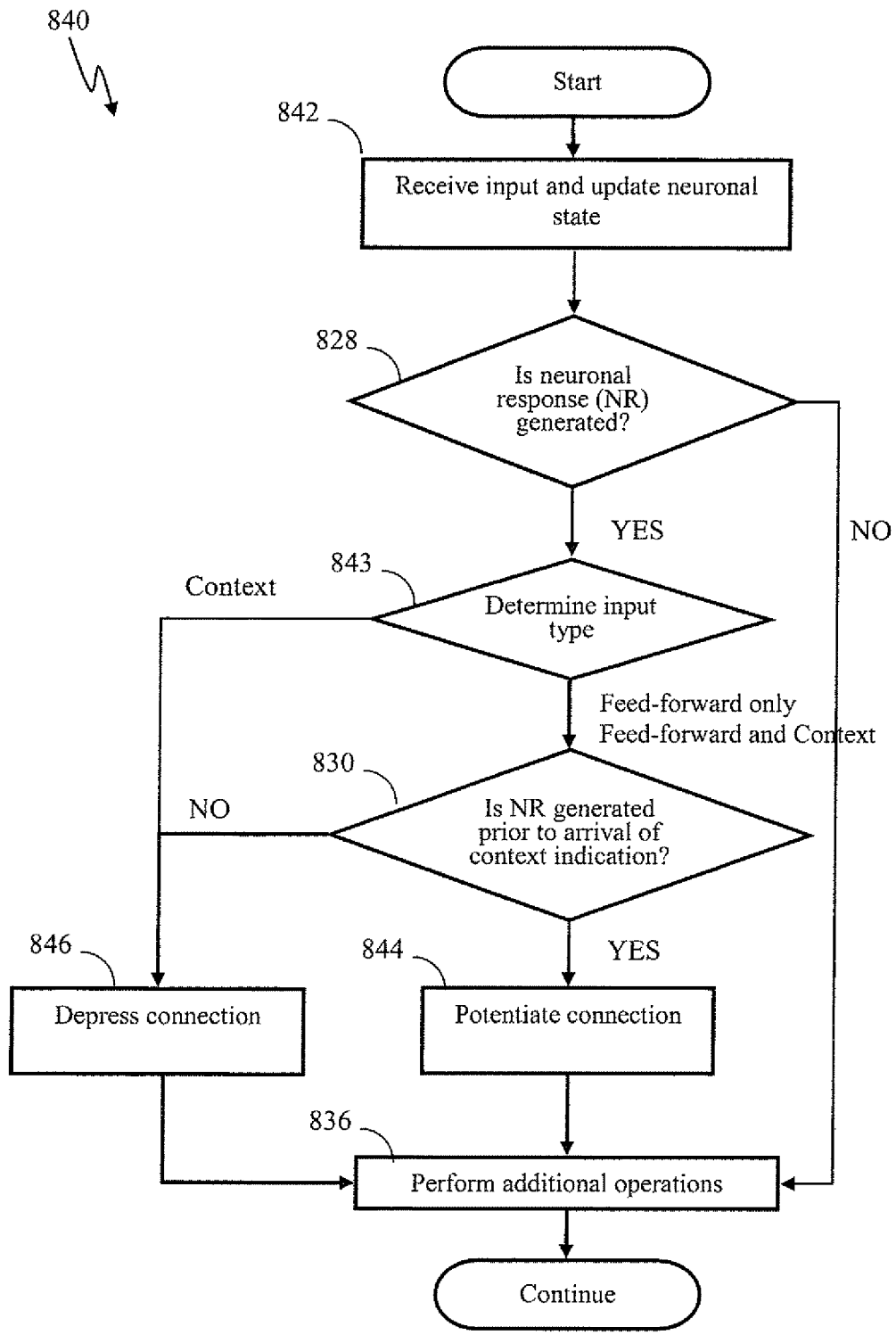
FIG. 8B is a logical flow diagram illustrating control of context-aided neuronal response, comprising synaptic connection potentiation and/or depression, in accordance with the one or more implementations.

Referring now to FIGS. 8-8B exemplary implementations of context aided neuronal response techniques according to the invention are described. The methods of FIG. 8-8B may be used, for example, for operating the neurons 302 of FIG. 3, or the neuron 502 of FIG. 5, thereby advantageously allowing for, inter alia, precise control of context-aided firing and feedback implementation useful in a spiking neuronal network such as the network 300 of FIG. 3, and the sensory processing apparatus described with respect to FIG. 10, infra.

Figure 10:
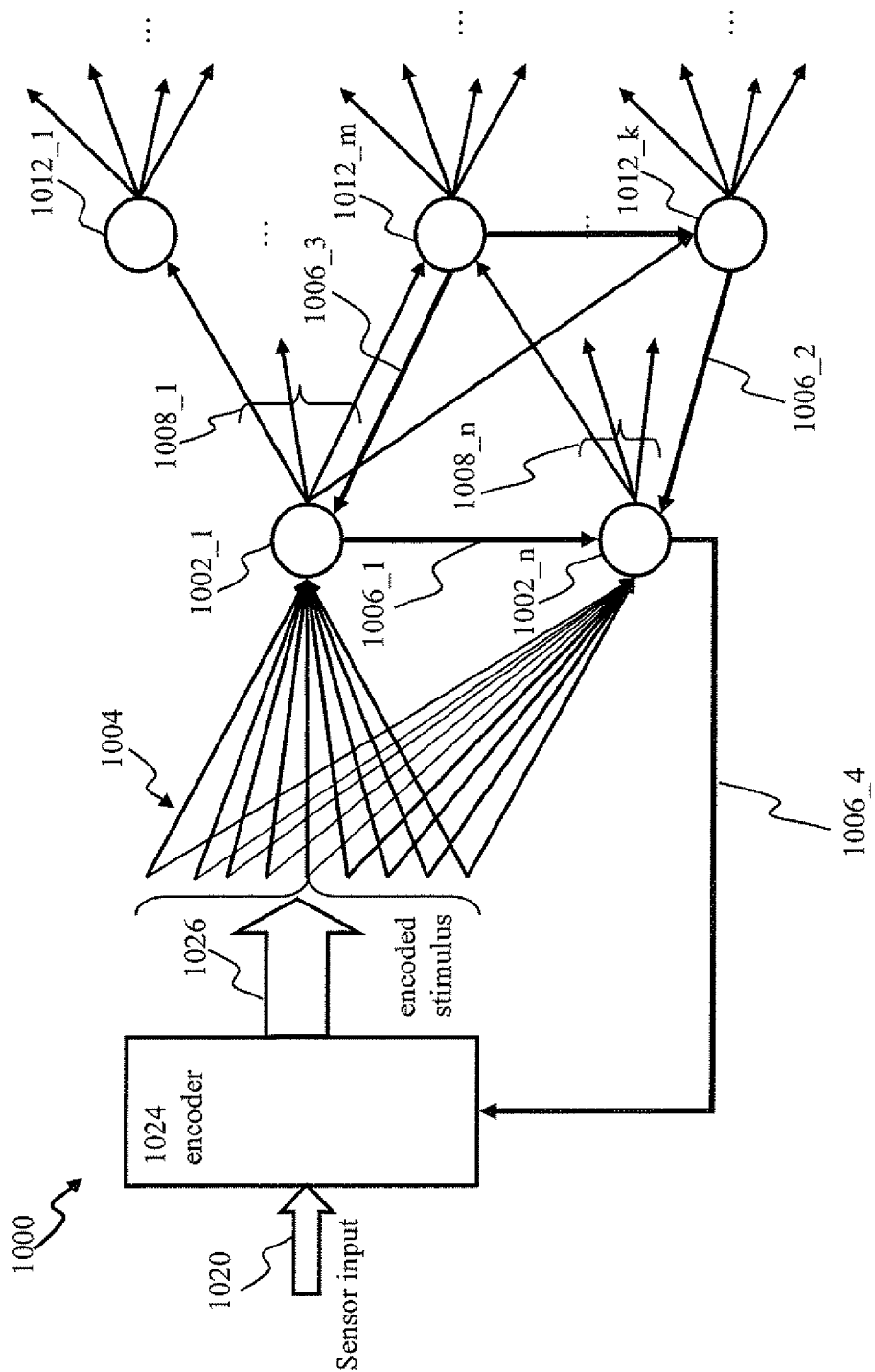
FIG. 10 is a block diagram illustrating single input type sensory processing apparatus comprising inverse-STDP feedback adjustment, in accordance with one or more implementations.

At step 802 of the method 800, a feed-forward stimulus input associated with a context is received at a spiking neuron (e.g., the neuron 502 of FIG. 5, or the neuron 1002 of FIG. 10). In some implementations, the feed-forward stimulus comprises a sensory stream (e.g., output of retinal ganglion cells in a visual spiking neural network) associated with an object or a feature (e.g., a triangle or an edge). In some implementations, the feed-forward stimulus comprises an output of pre-synaptic neurons of the preceding neuronal layer of the network. Based on the received feed-forward (pre-synaptic) input, the neuronal state may be updated. In one exemplary implementation, the neuronal state update is performed according to methodology described in U.S.

patent application Ser. No. 13/152,105 entitled "APPARATUS AND METHODS FOR TEMPORALLY PROXIMATE OBJECT RECOGNITION", incorporated by reference, supra). For instance, the neuron may be characterized by a current neuronal state and a threshold state (also referred to as the firing state). When the feed-forward input is sufficient to move the current neuronal state into the firing state (super-threshold current state) as a result of the neuronal state update, a neuronal response (spike; e.g., pulse 712 in FIG. 7) may be generated by the neuron. When the feed-forward input is not sufficient, the current state of the neuron (referred to as the sub-threshold state) is maintained, and no neuronal response (spike) occurs. In some implementations, the neuronal update may comprise execution of software instructions by a processor, or hardware instructions by a specialized integrated circuit. The neuronal update may alternatively comprise operating an analog circuit and evaluating a characteristic (e.g., voltage) versus a threshold value.

In some implementations, during neuronal state update, the efficacy of synaptic connections delivering feed-forward input to the neuron is updated according to, for example, the methodology described in co-owned and co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety. As described therein, in one or more exemplary implementations, one or more connection updates are accumulated over a period of time and updated in bulk to improve, inter alia, memory access efficiency.

Referring again to FIG. 8, at step 804 of the method 800, a context indication is received by the neuron, e.g., the signal 716 in FIG. 7, described supra. In some implementations, the context signal comprises information that is not a part of the direct (pre-synaptic) input into the neuron. The context signal may also comprise a feedback provided to the neuron by a higher level network layer. In some implementations, the contexts comprises lateral context signal provided by neighboring neurons of the same network layer (e.g., different portion of the edge as illustrated and described with respect to FIG. 9A, below); the contexts may also comprise a signal provided by network layer processing signals of different aspect (e.g., color) or different modality (e.g., sound), as described in detail with respect to FIGS. 9A, 12, below. Based on the receipt of context indication, the neuronal state may be updated, using any of the methodologies described above, and a neuronal response may be generated (e.g., the pulse 732 in FIG. 7), corresponding to the context-aided neuronal response.

At step 806 of method 800, generation time of the neuronal response is compared to arrival time of the context indication. Subsequent context-aided response of the neuron is controlled by, at least in part, generating an update of context connection contribution to the neuronal state based on the interval between the neuronal response and the context indication arrival time, using any applicable mechanism described supra (e.g., the pre-STDP rule described by the curve 664 in FIG. 6A). In one or more implementations, the update comprises adjusting the excitability contribution $g_i(t)$ that the context connection provides to the overall excitability of neuron, as described for example by Eqn. 6 above. In certain implementations, the update comprises adjusting the synaptic efficacy of the context connection (e.g., the connection 506 in FIG. 5, or the connection 1006 of FIG. 10).

FIG. 8A, illustrates one exemplary implementation of context-aided neuronal response control in accordance with the principles of the present disclosure Similar to the method 800 of FIG. 8 discussed supra, at step 822 of the method 810 of FIG. 8A, feed-forward stimulus input associated with a context is received at a spiking neuron. At step 824 of the method 820, a context indication, corresponding to the same context as the feed-forward input, is received by the neuron. As described above with respect to FIG. 8, neuronal state may be updated based on the receipt of the pre-synaptic inputs at steps 822, 824 of the method 820.

At step 828 of method 820, if no response has been generated by the neuron, the method proceeds to step 836.

At step 830, response generation time is compared to the context indication arrival time.

If the response has been generated by the neuron prior to arrival of context indication, the contribution of context connection (connection efficacy) to neuronal excitability is increased at step 834.

If the response has been generated by the neuron subsequent to arrival of context indication, the contribution of context connection (connection efficacy) to neuronal excitability is decreased at step 832. The context connection contribution adjustments performed at steps 832, 834 will, in the illustrated implementation, take effect upon receipt of subsequent feed forward input and/or subsequent context indication input into the neuron.

At step 836, additional operations may be performed, such as for example voltage potential relaxation during neuron refraction period.

FIG. 8B illustrates one exemplary implementation of controlling context aided neuronal response using inverse SDTP approach of the disclosure described herein. At step 842 of method 840, the neuron receives pre-synaptic input and neuronal state is updated using any of the methodologies described above. In some implementations, the pre-synaptic input may comprise both the feed-forward (stimulus) input, such as the input associated with the portion of triangle edge 912_6 in FIG. 9B, below. The input of step 842 may also comprise a context indication (e.g., the input associated with the portions of the triangle edge 912_7 in FIG. 9B). Alternatively, the input may only comprise the context input, such as the input associated with the portion of the triangle edge 912_7 in FIG. 9B.

At step 828 of method 840, if no response has been generated by the neuron, the method proceeds to step 836.

When the neuronal response (NR) has been generated, the type of input that caused the response is determined at step 843. If no feed-forward input has been received and no response generated, the contribution of the synaptic connection to neuronal state is reduced at step 846 by, for example, depressing the context connection using I-STDP rule 652 described with respect to FIG. 6A.

If feed-forward input has been received, the neuronal response generation time is compared to the context indication arrival time at step 830 of method 840.

If the response has been generated by the neuron prior to arrival of context indication, the contribution of the synaptic connection to neuronal state is increased at step 844 by, for example, potentiating the context connection using I-STDP rule 654 described with respect to FIG. 6A.

If the response has been generated by the neuron subsequent to arrival of context indication, the method proceeds to step 846, described above.

As set forth above with respect to methods 800, 820 of FIGS. 8-8A, context connection contribution adjustments performed at steps 846, 844 of the method 840 take effect upon receipt of subsequent feed forward input and/or subsequent context indication input into the neuron.

At step 836 of method 840, additional operations may be performed, such as, for example, voltage potential relaxation during neuron refraction period.

Context Connection Adjustment

Figure 13:
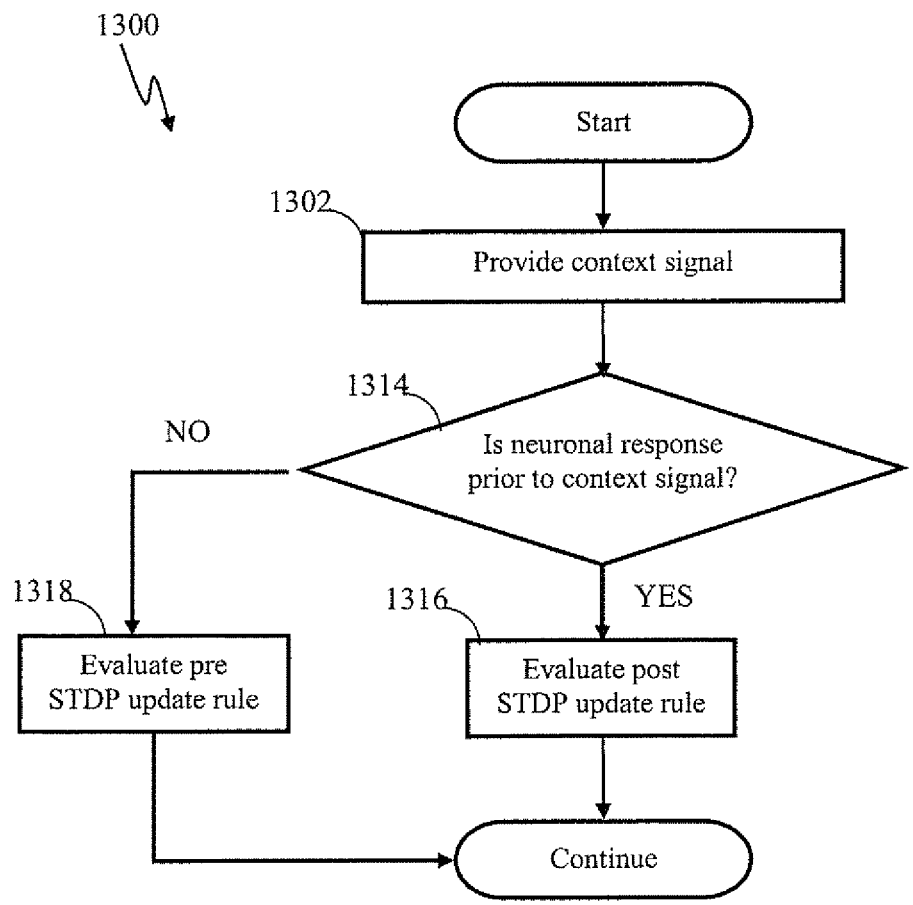
FIG. 13 is a logical flow diagram illustrating context connection adjustment based on an interval between context signal and response, in accordance with one or more implementations.
Figure 13A:
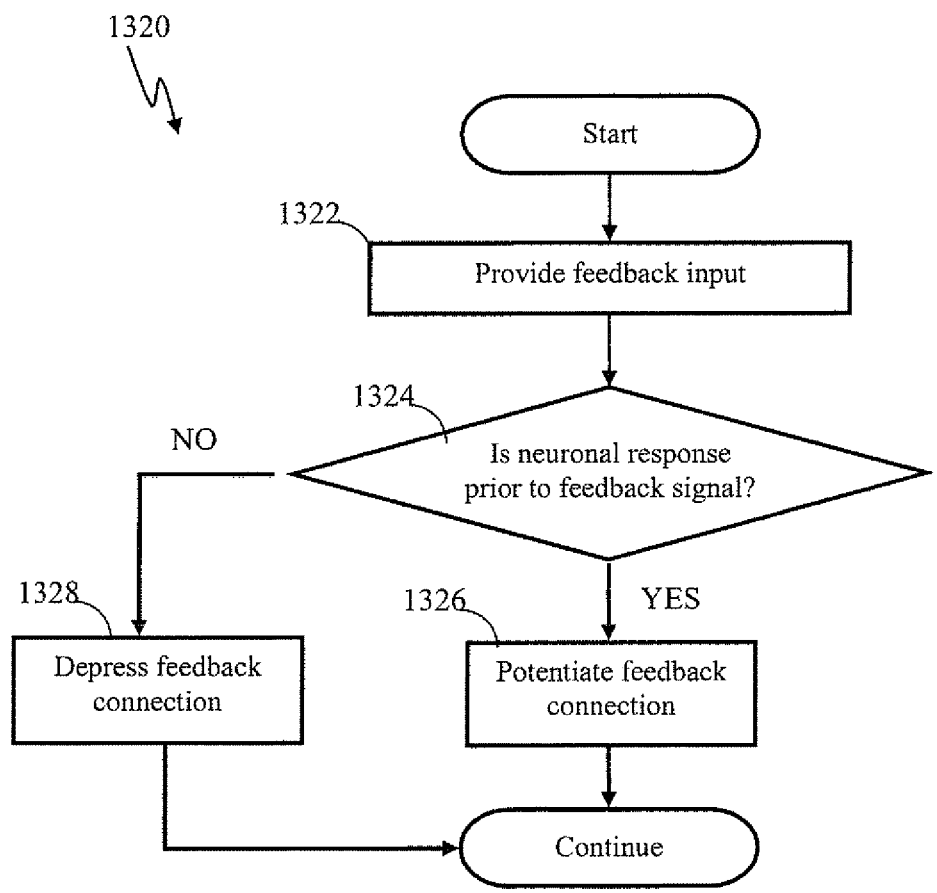
FIG. 13A is a logical flow diagram illustrating context connection potentiation and depression based on an interval between context signal and response, in accordance with one or more implementations.

Referring now to FIGS. 13-13A exemplary implementations of synaptic plasticity methods for context connections (useful, e.g., with the network 300, described with respect to FIG. 3 and the sensory processing apparatus, described with respect to FIG. 10, infra) according to the disclosure are described. The methods 1300, 1320 of FIGS. 13-13A advantageously allow, inter alia, precise control of context-aided firing and elimination of positive feedback loops, in a spiking neuronal network.

At step 1312 of the method 1300 of FIG. 13, a context signal is delivered to a spiking neuron (e.g., the neuron 502 of FIG. 5, or the neuron 1002 of FIG. 10). In some implementations, the context signal comprises information that is not a part of the direct (pre-synaptic) input into the neuron. The context signal may also comprise feedback provided to the neuron by a higher level network layer. In some implementations, the contexts comprises signal provided by adjacent neurons of the same network layer (lateral context).

At step 1314, the generation time of a neuronal response (by the neuron receiving the context signal) is evaluated, such as e.g., by comparison to a time of a context signal. At step 1318, if the context signal precedes neuronal response, the pre-STDP update rule is evaluated, using any applicable mechanism described supra (e.g., the pre-STDP rule described by the curve 664 in FIG. 6A).

At step 1316, if the neuronal response precedes context signal, the post-STDP update rule is evaluated, using any applicable mechanism described supra (e.g., the post-STDP rule described by the curve 662 in FIG. 6A).

In certain implementations, the neuronal state may be updated in response to a pre-synaptic event (e.g., receipt of the context input). If, at the time of generating the output the context had not yet arrived, then the connection weight cannot be adjusted (as the timing information that is required for performing STDP weight adjustment is unavailable). That information only becomes available when the context actually arrives (at a later time), but the actual weight can remain unchanged until the arrival of the next context pulse, as described in a commonly owned and co-pending U.S. patent application Ser. No. 13/239,255, entitled "APPARATUS AND METHODS FOR SYNAPTIC UPDATE IN A PULSE-CODED NETWORK", filed on Sep. 21, 2011, incorporated herein by reference in its entirety.

FIG. 13A illustrates one exemplary implementation of feedback connection adjustment in accordance with the disclosure.

At step 1322 of the method 1320, a feedback signal is provided via context connection to, for example, a spiking neuron (e.g., the neuron 502 of FIG. 5, or the neuron 1002 of FIG. 10. The context signal may also comprise feedback provided to the neuron from neuron of a higher level network layer (e.g., the neuron 522 of FIG. 5).

At step 1324, the generation time of a neuronal response (by the neuron receiving the context signal) is compared to time of the feedback input. At step 1328, if the feedback input precedes neuronal response, the feedback connection is depressed using, for example, the pre-STDP update rule described by the curve 664 in FIG. 6A.

At step 1328, if feedback input follows the neuronal response, the feedback connection is potentiated using, for example, the post-STDP rule described by the curve 662 in FIG. 6A.

Context Contribution Adjustment Due to Context Switching

Figure 9A:
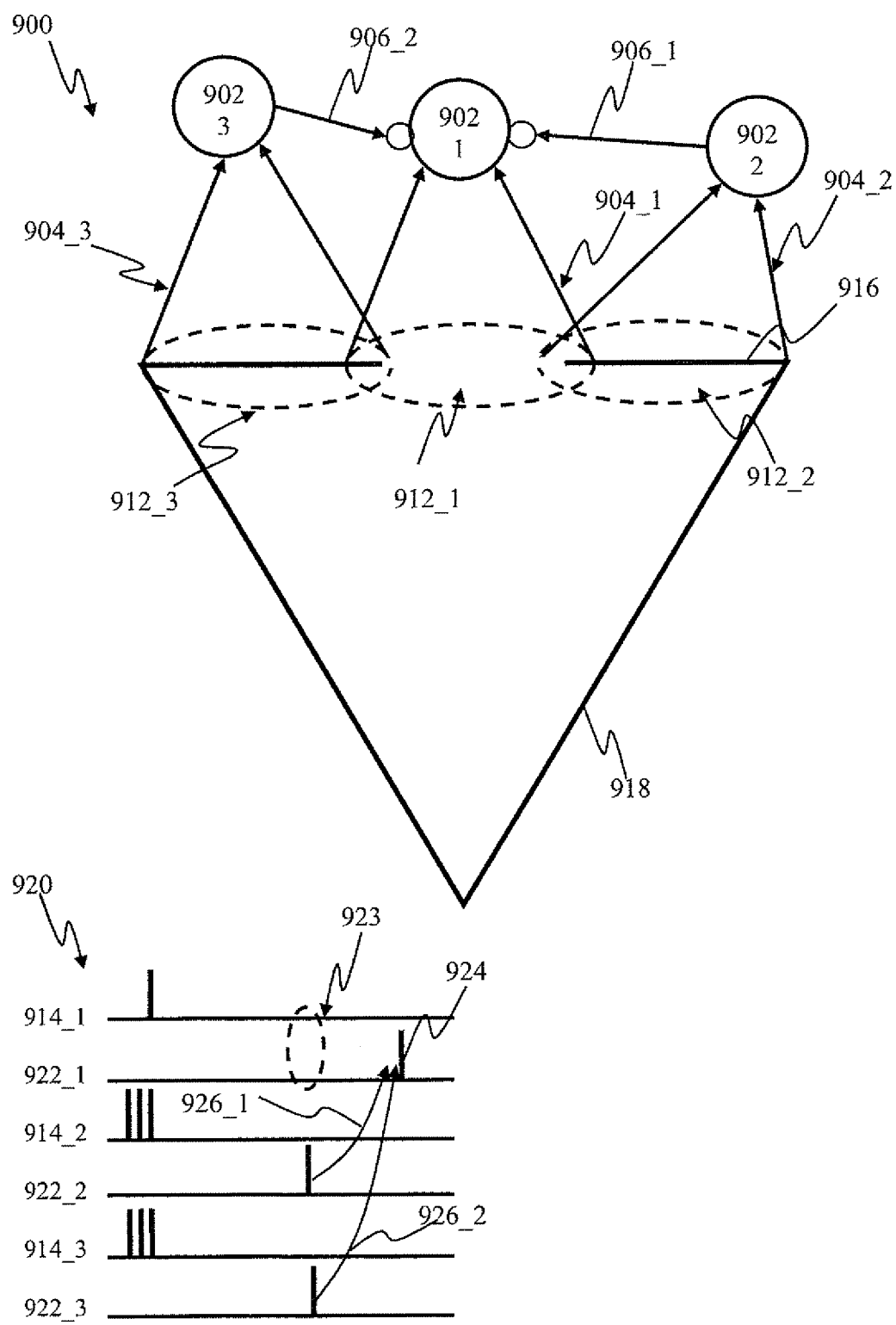
FIG. 9A is a graphical illustration of inverted STDP adjustment of a context connection, in accordance with one or more implementations.

In addition to reducing (or eliminating) unhindered spiking due to feedback, various implementations of the methodologies described herein advantageously enable connection adjustment due to changing context, now described in detail with respect to FIGS. 9A-10.

FIG. 9A illustrates one implementation of a spiking network sensory processing apparatus comprising I-STDP feedback adjustment. The apparatus 900 comprises several spiking neurons 902 configured to receive sensory input (stimulus) via the pre-synaptic connections 904. Each neuron 902_1, 902_2, 902_3 is characterized by a receptive field denoted by broken curves 912,_1, 912,_2, 912,_3, respectively. The receptive fields describe a spatial area that provides feed-forward input stimulus to the respective neuron. In some implementations, the receptive field corresponds to a group of retinal ganglion cells (RGC), as applied to visual sensory data processing. In other implementations, the receptive fields can correspond to a group of other neurons arranged spatially, representing an intermediate stage of processing of sensory input.

The panel 920 of FIG. 9A illustrates a pulse pattern corresponding to the operation of the neuronal network 900. The pre-synaptic input, associated with each receptive field 912,_1, 912,_2, 912,_3, comprises a representation of an object (or an object feature), such as for example an edge 916 of the triangle 918 in FIG. 9A. The neurons 902_2, 902_3 each receive the feed-forward stimulus (depicted using traces 914_2, 914_3 in FIG. 9A), via the pre-synaptic channels 904_2, 904_3. This stimulus 914_2, 914_3 causes the neurons 902_2, 903_3 to generate the output (depicted by the traces 922_2, 922_3 in the panel 920).

As the receptive field 912_1 associated with the neuron 902_1 does not contain the respective portion of the edge 916 (due to a variety of causes, such as an obstacle between the object and the sensor or a missing edge segment), the respective feed-forward input stimulus to the neuron 902_1 is weaker (as depicted by the trace 914_1 in the panel 920) or altogether absent. Hence, the stimulus 914_1 is not sufficient to trigger output generation by the neuron 902_1, as illustrated by the pulse absence in the area marked with the broken curve denoted 923.

According to the implementation illustrated in FIG. 9A, the neurons 902_2, 902_3 provide context signal (feedback) to the neuron 902_1 via the context connections 906_1, 906_2. Based on this feedback (illustrated by the arrows denoted 926_1, 926_2 in FIG. 9A), the neuron 902_1 may generate the output 924. In this case, the context provides additional evidence for the existence of a feature in the input (even given a weak feed-forward signal to the neuron), and hence improves signal-to-noise ratio (SNR). Such context-induced firing causes depression of the respective context feedback connections (e.g., the connection 906_1, 906_2 in FIG. 9A). As a result, one or more consecutive context-based output firing events (by the neuron 902_1) sufficiently depress the feedback connections to below the level where their input becomes insufficient for output generation (see, e.g., FIG. 15C, supra). Hence, the I-STDP feedback adjustment mechanism of the exemplary implementations of the invention enables precise control of the context driven output firing, and advantageously prevents uncontrolled propagation of 'illusory' phantom responses within the spiking network.

Figure 9B:
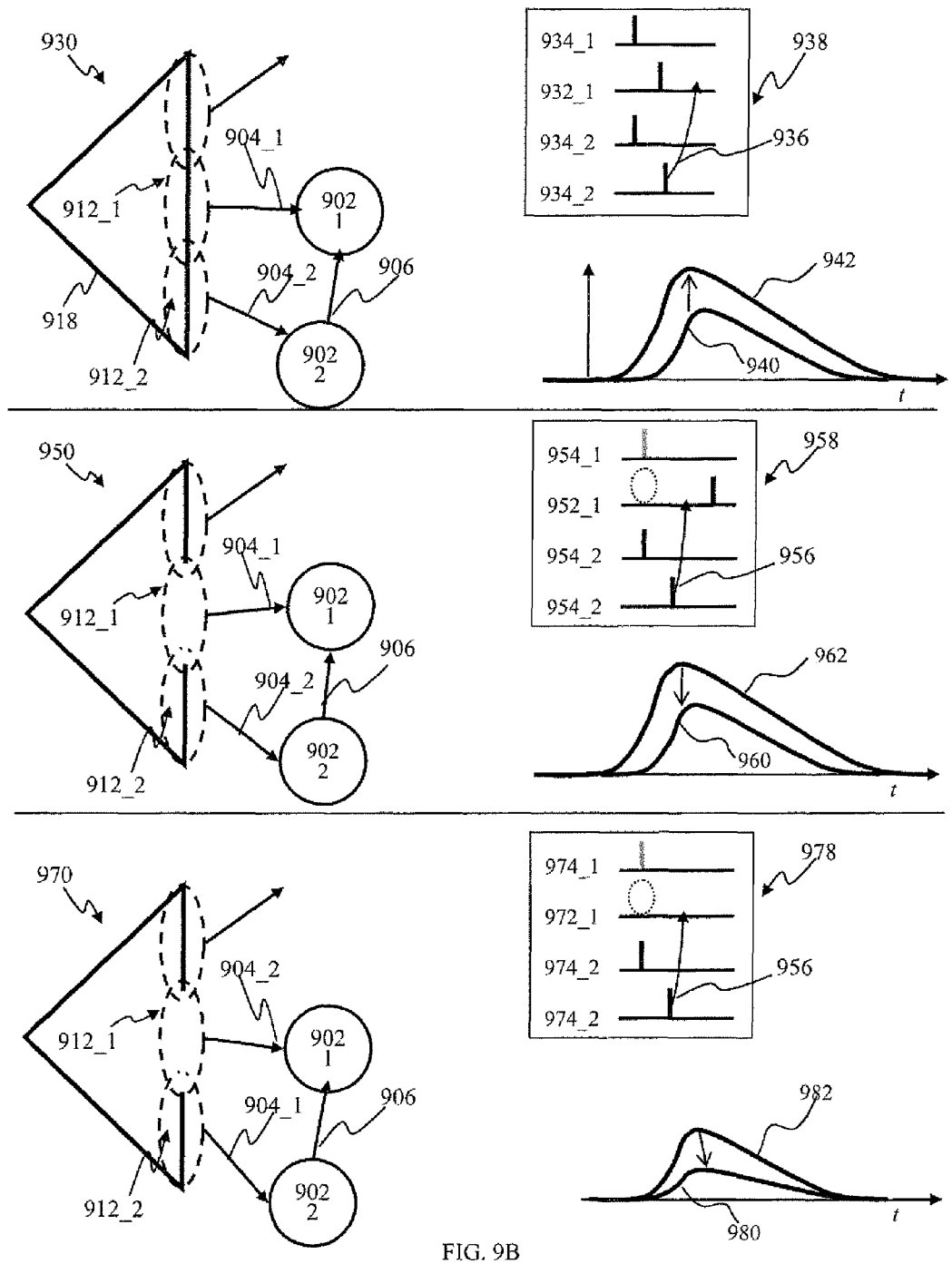
FIG. 9B is a graphical illustration of inverted STDP context connection adjustment due to changing context in accordance with one or more implementations.

In another implementation (described with respect to FIG. 9B herein), the I-STDP feedback connection adjustment enables uninterrupted feature detection by the spiking network. The panel 930 of FIG. 9B illustrates another exemplary spiking network configuration, similar to the network 900 of FIG. 9A. Only two neurons 902_1, 902_2 are shown in FIG.

9B for clarity, although it is appreciated that any number of neurons may be present. The panel 930 of FIG. 9B depicts the receptive fields of both neurons (912_4, 912_5, respectively) containing a portion of the feature (e.g., the edge of the triangle 918). The feed-forward input stimuli 934_1, 934_2 provided via the connections 904_1, 904_2, respectively cause both neurons 902 to generate output, as illustrated by the traces 932_1, 932_2 in the pulse panel 938 in FIG. 9B. In the implementation of FIG. 9B, the output of the neuron 902_2 provides context input (feedback) for the neuron 902_1 via the connection 906. As the feedback (depicted by the arrow 936 in FIG. 9B) arrives after (or coincident with) the output pulse (the pulse depicted on the trace 932_1 in FIG. 9B), the context connection 906 is potentiated, such as for example by according to the methodology described with respect to FIGS. 6-8, supra. This results in increased contribution (the curves 940, 942 in FIG. 9B) of the context connection 906 to the dynamic state of the neuron 902_1, as illustrated by the contribution increase from the pre-adjustment curve 940 to the post-adjustment curve 942. As the firing pattern shown in the panel 938 persists, the connection 906 is further potentiated and the connection contribution continues to grow.

Contrasted with the configuration of the panel 930, the relevant feature is missing from the receptive field 912_1 of the panel 950 in FIG. 9B. As a result, the feed-forward input stimulus to this neuron is weak (or absent), as illustrated by the trace 952_1 in the panel 958 of FIG. 9B, and the neuron 902_1 does not generate the output, as shown by the trace 952_1. The neuron 902_2 receives the required stimulus (trace 9542), and generates the output (the trace 952_2) which is provided to the neuron 902_1 as context. As the connection has been previously potentiated (as described above), the connection contribution to the neuron dynamic state is sufficient to cause the neuron 902_1 to generate the output. As the feedback (depicted by the arrow 956 in FIG. 9B) arrives prior to the output (the pulse depicted on the trace 952_1 in FIG. 9B), the context connection 906 is depressed, such as according to the methodology described with respect to FIGS. 6-8, supra. This results in a reduced contribution (the curves 960, 962 in FIG. 9B) of the context connection 906 to the dynamic state of the neuron 902_1, as illustrated by the contribution increase from the pre-adjustment curve 960 to the post-adjustment curve 962. If the feature is persistently missing from the receptive field 912_1 (as illustrated by the panel 970 in FIG. 9B), the feedback connection 906 is gradually weakened (depicted by the post-adjustment curves 980, 982), and the neuron 902_1 ceases solely firing due to context, as illustrated by the pulse panel 978 in FIG. 9B.

In some implementations of the invention, neurons (e.g., the neurons 902) may receive two classes of excitatory input: (i) the feed-forward stimulus input; and (ii) contextual input (representing state of some other part of the network) at the time the neurons 902 receive the feed-forward stimulus. In the specific implementation described with respect to FIGS. 9A-9B, the context input (e.g. the input received by the neuron 902_1 via the channel 906_1) is associated with the input of the same modality (e.g., the visual inputs) and the same aspect of this modality (i.e., related to detection of an edge), as the feed-forward stimulus signal, provided for example, via the connections 904_1.

In some implementations, the feed-forward stimulus signal and the context signal describe different aspects of the same sensory modality (e.g., color, shape, intensity, etc. of an object), which together provide a common context and enable context-based object detection. Similarly, motion of an object such as a hand motion, detected in visual data, may aid tracking the trajectory of a ball, or an infrared signal during a missile launch may aid missile trajectory tracking by a radar. In some implementations, the feed-forward stimulus signal and the context signal correspond to different sensory modalities altogether (e.g., visual, audio, tactile, somatosensory, gustatory, olfactory, Radio Frequency (RF), Magnetic, Electric, or Electromagnetic (EM)), wherein the activity of these areas statistically and temporally correlates with the activity of a given neuronal node (e.g., speech and gestures).

By way of example, the context signal arrives from the audio processing area that responds to a ringing door bell, while the feed-forward input stimulus corresponds to light stimulus, generated by a visual light strobes of the dual mode door bell. Provided that there is a close temporal correlation between the two sensory input modalities (e.g., the signals on connections 904, 906 in FIG. 9B) during for example a network "learning" stage, the neuron (e.g., the neuron 902) will continue to generating outputs even when the visual stimulus is missing (an audible ring-only doorbell).

In another exemplary implementation, the contextual input may arrive from a motor processing area of the neural network, and conveys information about planned or currently executing motor action (e.g., turning of a head, or a robotic camera). This information provides the relevant context for a neuron (or neurons) of visual processing area of the network, if the particular motor action results in sensory perception which uniquely stimulates the neuron of the visual area. In this case the state of the motor cortex can ensure (provide additional evidence) for the activity of that neuron. The context aided firing advantageously improves detection capabilities of a neuron by providing additional evidence to recognize particular stimuli.

When the contextual input and sensory input mismatch (e.g., the contextual input causes the context-induced firing described supra), these contextual connections are weakened. Various implementations of the disclosure provide a mechanism by which such behavior is removed, such as in the case where the mismatch happens consistently and often, by depressing the contextual input. If such depression occurs, the neuron can start increasing other contextual connections which provide more reliable and accurate context to a firing of the cell. Removal of irrelevant context connections advantageously removes false responses which otherwise could lead to hallucinations (states in which internal representation of reality does not match the reality).

Control of Positive Feedback

Figure 14A:
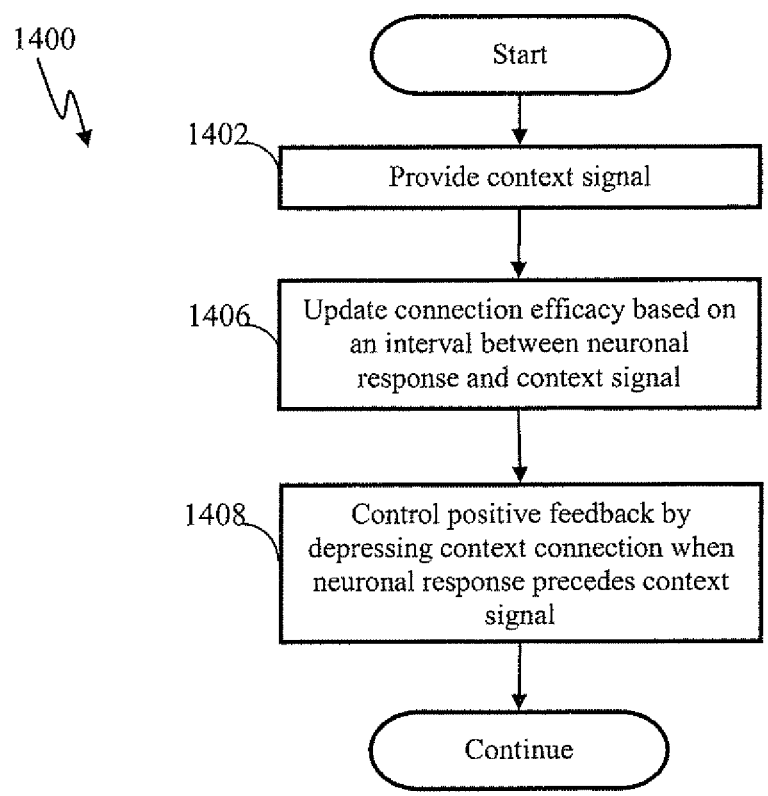
FIG. 14A is a logical flow diagram illustrating control of positive feedback, comprising feedback connection depression, in accordance with one or more implementations.
Figure 14B:
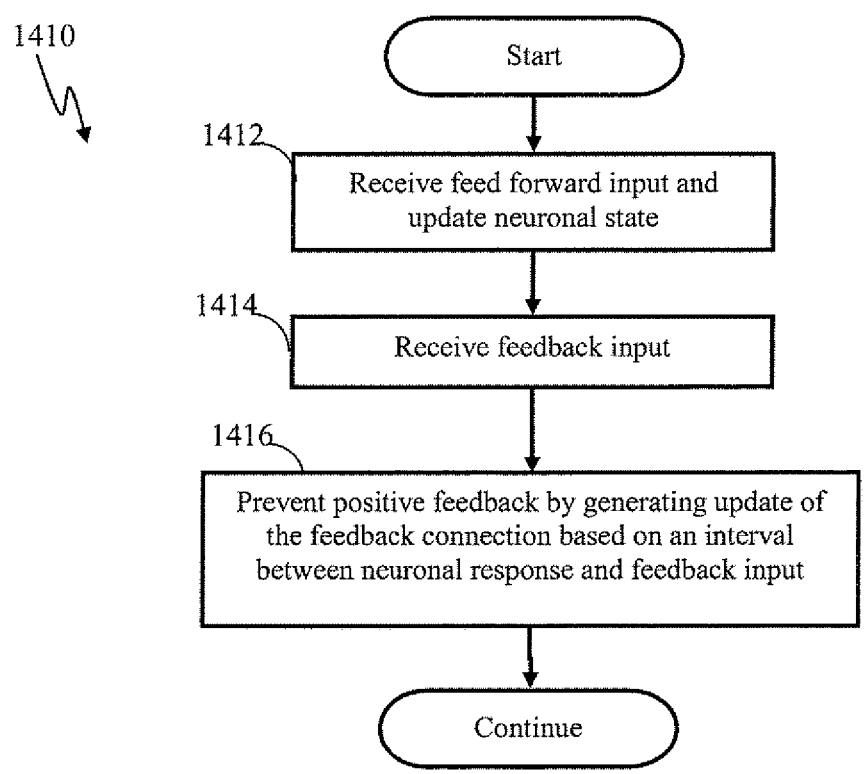
FIG. 14B is a logical flow diagram illustrating control of positive feedback using feedback context connection adjustment, in accordance with one or more implementations.

Referring now to FIGS. 14A and 14B, methods of controlling positive feedback (for use with, e.g., with the spiking network 300 described with respect to FIG. 3, and the sensory processing apparatus described with respect to FIG. 10, infra) according to the invention are described. The exemplary method 1400 of FIG. 14A may advantageously be used for example in operating synaptic connections, while the method 1410 of FIG. 14B may be used for example when operating spiking neurons of the network 300.

At step 1402 of method 1400, a context input is delivered via the context connection (e.g., the connection 306 of FIG. 3).

At step 1406, connection efficacy is adjusted based on a time interval between neuronal response and time of the context input. In some implementations, the neuronal response may be based at least in part on a feed-forward input and in part on the context input, and the adjustment comprises for example the inverse STDP plasticity rules described with respect to FIGS. 6-6B supra.

If at the time of generating the output the context had not yet arrived, then the connection weight cannot be adjusted, as the timing information that is required for performing STDP weight adjustment is unavailable. That information only becomes available when the context actually arrives (at a later time), but the actual weight can remain unchanged until the arrival of the next context pulse, as described in a commonly owned U.S. patent application Ser. No. 13/239,255, entitled "APPARATUS AND METHODS FOR SYNAPTIC UPDATE IN A PULSE-CODED NETWORK", incorporated supra.

At step 1408 of method 1400, the feedback connection adjustment generated at step 1406 is applied to the neuronal state upon receipt of subsequent inputs (either feed-forward or feedback), thereby effecting control of positive feedback loop. By way of illustration, when the feedback is received prior to generation of neuronal post synaptic response), the feedback contribution is reduced for subsequent inputs, thereby 'clamping down' or mitigating the positive feedback mechanism that may otherwise cause runaway uncontrolled neuronal response (firing).

The method 1410 of FIG. 14B illustrates on exemplary implementation of positive feedback control in a spiking neuron. At step 1412 of method 1410, feed-forward input is received by the neuron (e.g., input 714 of FIG. 7 or input 1026 of FIG. 10). In one or more implementations, the feed-forward input of step 1412 is configured similar to the feed-forward input described with respect to step 802 of method of FIG. 8, supra.

At step 1414 of method 1410, feedback input is received by the neuron. In one or more implementations, the feedback input of step 1414 is configured similar to the feedback input described with respect to step 1322 of method of FIG. 13A, supra.

At step 1416, generation time of the neuronal response is compared to arrival time of the feedback input. Subsequent feedback-aided responses of the neuron (associated with a positive feedback loop) are controlled by, at least in part, generating an update of feedback connection contribution to the neuronal state based on, e.g., the interval between the neuronal response and the feedback input arrival time, using any applicable mechanism described supra (e.g., the pre-STDP rule described by the curve 664 in FIG. 6A). In some implementations, the update comprises adjusting the excitability contribution $g_i(t)$ of context connection to the overall excitability of neuron, as described for example by Eqn. 6 above. The update may also comprise adjusting synaptic efficacy of the context connection (e.g., the connection 506 in FIG. 5, or the connection 1006 of FIG. 10).

If at the time of generating the output, the context has not yet arrived, then the connection weight cannot be adjusted, as the timing information that is required for performing STDP weight adjustment is unavailable. That information only becomes available when the context actually arrives (at a later time), but the actual weight can remain unchanged until the arrival of the next context pulse, as described above, with respect to FIG. 14A.

Exemplary Apparatus

Various exemplary spiking network apparatus comprising one or more of the methods set forth herein (e.g., using the exemplary inverse STDP feedback plasticity rules explained above) are now described with respect to FIGS. 10-11D.

Inverse STDP Feedback Plasticity Sensory Processing Apparatus

One apparatus for processing of single type sensory information using spiking neural network comprising for example the inverse-STDP feedback adjustment is shown in FIG. 10. In some implementations, the single type input may comprise a single modality (e.g., visual, audio, somatosensory) sensory input. In one or more implementations, the single type input may comprise a single aspect of a sensory modality (e.g., brightness or color) sensory input. The illustrated processing apparatus 1000 may comprise an encoder 1024 configured to receive an input sensory signal 1020. In some implementations, this sensory input comprises electromagnetic waves (e.g., visible light, IR, UV, etc.) entering an imaging sensor array (comprising RGCs, a charge coupled device (CCD), or an active-pixel sensor (APS)). The input signal in this case is a sequence of images (image frames) received from a CCD camera via a receiver apparatus, or downloaded from a file. Alternatively, the image is a two-dimensional matrix of RGB values refreshed at a 24 Hz frame rate. It will be appreciated by those skilled in the art that the above image parameters are merely exemplary, and many other image representations (e.g., bitmap, CMYK, grayscale, etc.) and/or frame rates are equally useful with the present invention.

The encoder 1024 transforms (encodes) the input signal into an encoded signal 1026. In one variant, the encoded signal comprises a plurality of pulses (also referred to as a group of pulses) configured to model neuron behavior. The encoded signal 1026 is transmitted from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in the embodiment of FIG. 10 for clarity, it is appreciated that the encoder can be coupled to any number of detector nodes that is compatible with the detection apparatus hardware and software limitations. Furthermore, a single detector node may be coupled to any practical number of encoders.

In one embodiment, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application. Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce detection signals transmitted over communication channels 1008. In FIG. 10, the designators 1008_1, 1008_n denote output of the detectors 1002_1, 1002_n, respectively.

In one implementation, the detection signals are delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Each of the detectors within upstream detector layer 1002 may generate detection signals on communication channels 1008_1, 1008_n (with appropriate latency) that propagate with different conduction delays to the detectors of the downstream layer of detectors 1012. The detector cascade of the embodiment of FIG. 10 may contain any practical number of detector nodes and detector banks determined, inter alia, by the software/hardware resources of the detection apparatus and complexity of the objects being detected.

The sensory processing apparatus implementation illustrated in FIG. 10 further comprises feedback connections 1006. In some variants, connections 1006 are configured to communicate context information from a detector within the same hierarchy layer, also referred to as the lateral context (illustrated by the connection 1006_1 in FIG. 10). In another variant, connections 1006 are configured to communicate context information from detectors within other hierarchy layer, also referred to as the context feedback illustrated by the connections 1006_2, 1006_3 in FIG. 10. In yet another variant, connection 1006_4 is configured to provide feedback to the encoder 1024 thereby facilitating sensory input encoding.

Figure 10A:
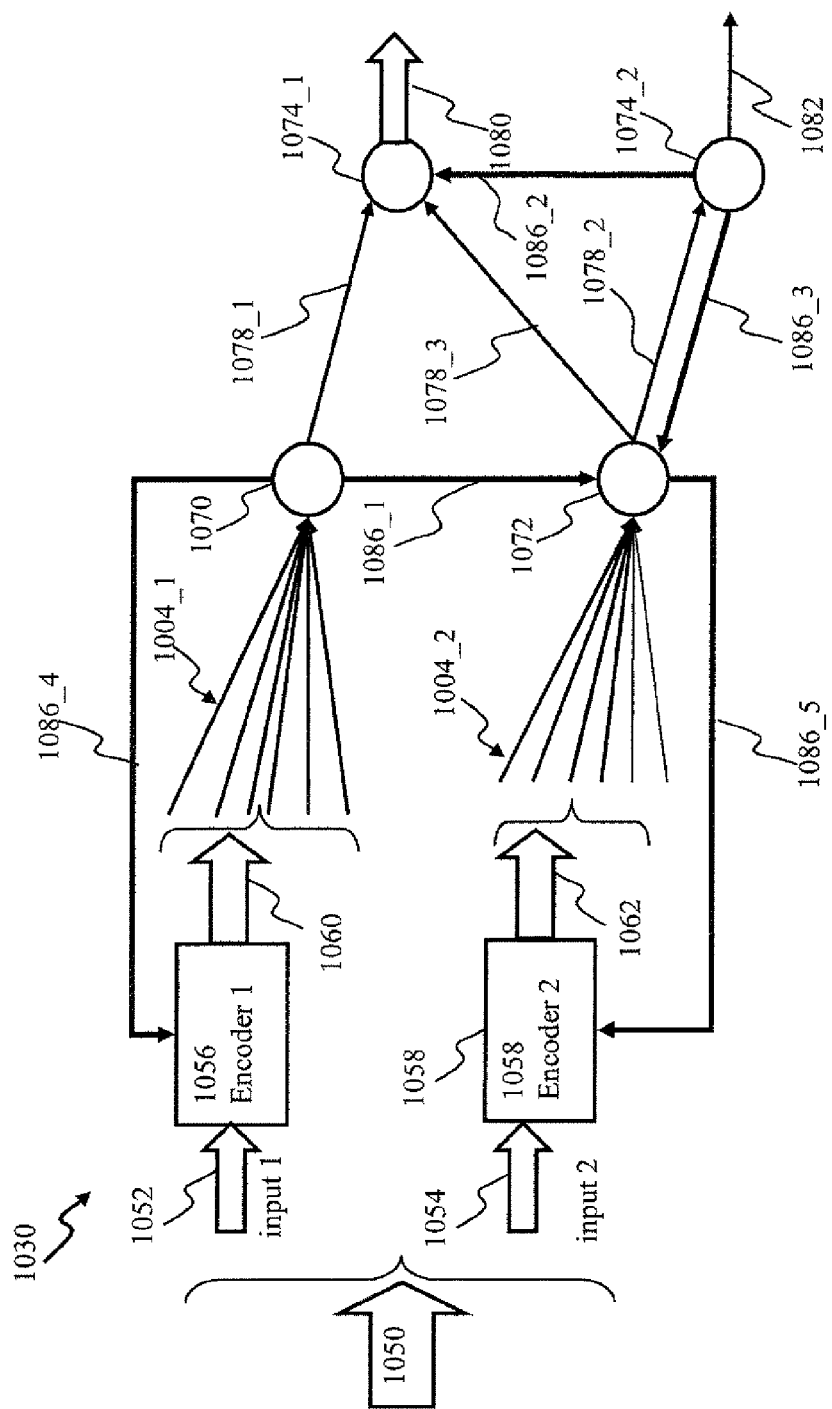
FIG. 10A is a block diagram illustrating multiple input type sensory processing apparatus comprising inverse-STDP feedback adjustment, in accordance with one or more implementations.

One apparatus for processing of sensor information 1050 comprising two or more input types 1052, 1054, using spiking neural network comprising for example the inverse-STDP feedback adjustment, is shown in FIG. 10A. The processing apparatus 1030 illustrated in FIG. 10A may comprise two or more encode 1056, 1058 configured to receive the sensory inputs 1052, 1054, respectively. In some implementations, the multiple input types 1052, 1054 may comprise two or more aspects (e.g., brightness and color) of the same sensory modality input. In one or more implementations, the multiple type input may comprise two or more sensory modality inputs (e.g., visual, audio, somatosensory). In one or more implementations, the multiple type input may comprise electromagnetic waves (e.g., visible light, IR, UV, etc.) entering an imaging sensor array (comprising RGCs, a charge coupled device (CCD), or an active-pixel sensor (APS)).

The encoders 1056, 1058 may transform (encode) the inputs 1052, 1054 into encoded signals 1060, 1062. In one variant, the encoded signals may comprise a plurality of pulses (also referred to as a group of pulses) configured to model neuron behavior. The encoded signals 1062 may be transmitted from the encoders 1056, 1058 via multiple connections 1004_1, 1004_2 to two or more neuronal nodes 1070, 1072.

Although only two detectors (1070, 1072) are shown in FIG. 10A for clarity, it is appreciated that each encoder 1056, 1058 may be coupled to any number of detector nodes that is compatible with the detection apparatus hardware and software limitations.

In one implementation, each of the detectors 1070, 1072 contain logic (which may be implemented as a software code, hardware logic, or a combination of thereof) configured to recognize a predetermined pattern of pulses in the encoded signal 1060, 1062 and to produce detection signals transmitted over communication channels 1078, as described with respect to FIG. 10, supra.

In one implementation, the detection signals are delivered to a next layer of the detectors (comprising detectors 1074_1, 1074_2 in FIG. 10A) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, each subsequent layer of detectors is configured to receive signals from the previous detector layer, and to detect more complex features and objects (as compared to the features detected by the preceding detector layer).

The sensory processing apparatus implementation illustrated in FIG. 10A may further comprise feedback connections 1086. In some variants, connections 1086 may be configured to communicate context information from a detector within the same hierarchy layer, also referred to as the lateral context (illustrated by the connection 1086_1, 1086_2 in FIG. 10A). In another variant, connections 1086 may be configured to communicate context information from detectors within other hierarchy layer, also referred to as the context feedback illustrated by the connection 1086_3, 1006_3 in FIG. 10A. In yet another variant, the connections 1086 may be configured to provide feedback to the encoders (e.g., the connections 1086_4, 1086_5 coupled to the encoders 1056, 1058 in FIG. 10A) thereby facilitating sensory input encoding. In some implementations, the feedback mechanism effectuating using the connections 1086 may aid the sensory processing apparatus to detect relevant features in the input 1050 and to generate output signals 1080, 1082

Computerized Neuromorphic System

Figure 11A:
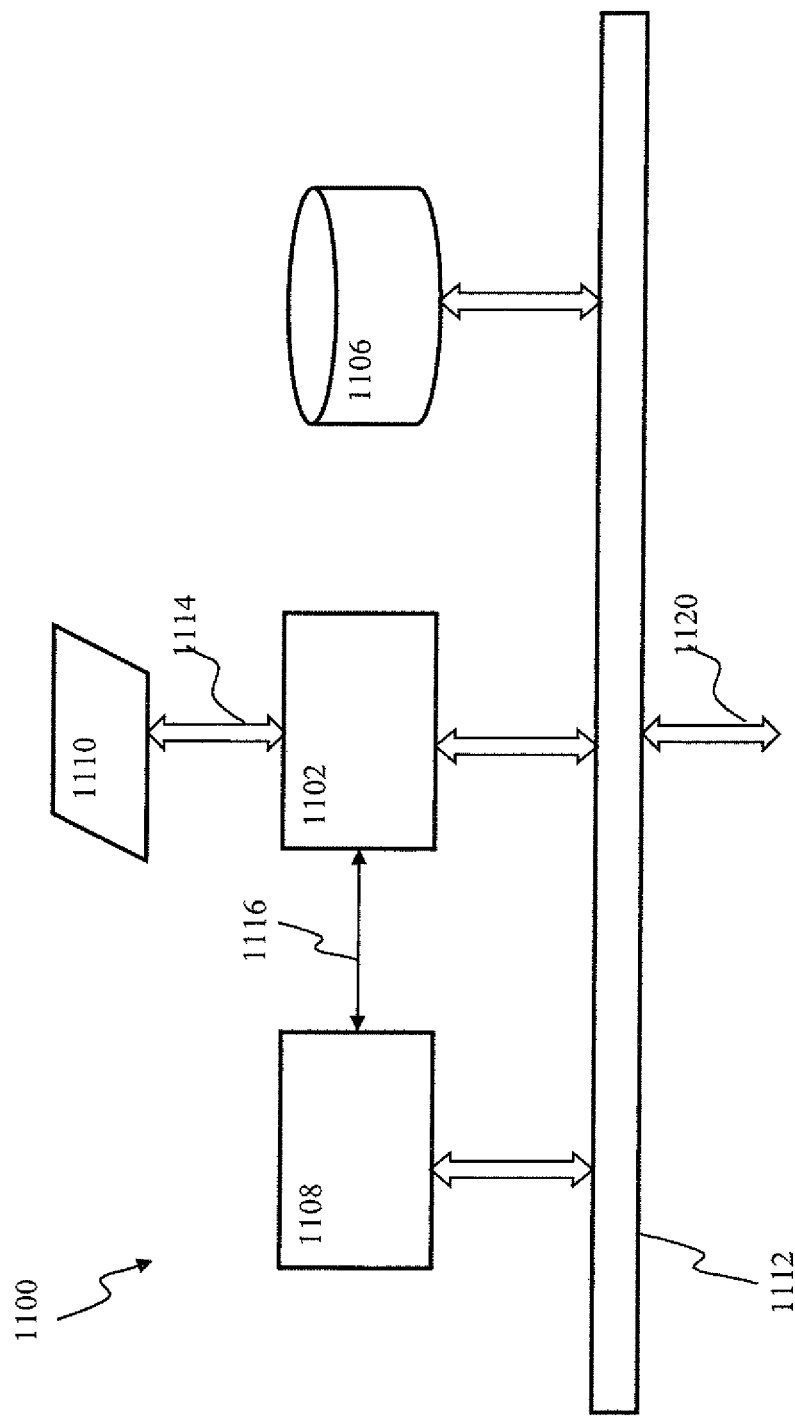
FIG. 11A is a block diagram illustrating computerized system useful for inverse-STDP feedback adjustment in a spiking network, in accordance with one or more implementations.

One particular implementation of the computerized neuromorphic processing system, for operating a computerized spiking network (and implementing the exemplary inverse STDP context connection adjustment methodology described supra), is illustrated in FIG. 11A. The computerized system 1100 of FIG. 11A comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 526 in FIG. 5), and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to embodiments of the invention including, for example, an LCD/LED monitor, touch-screen input and display device, speech input device, stylus, light pen, trackball, end the likes.

Figure 11B:
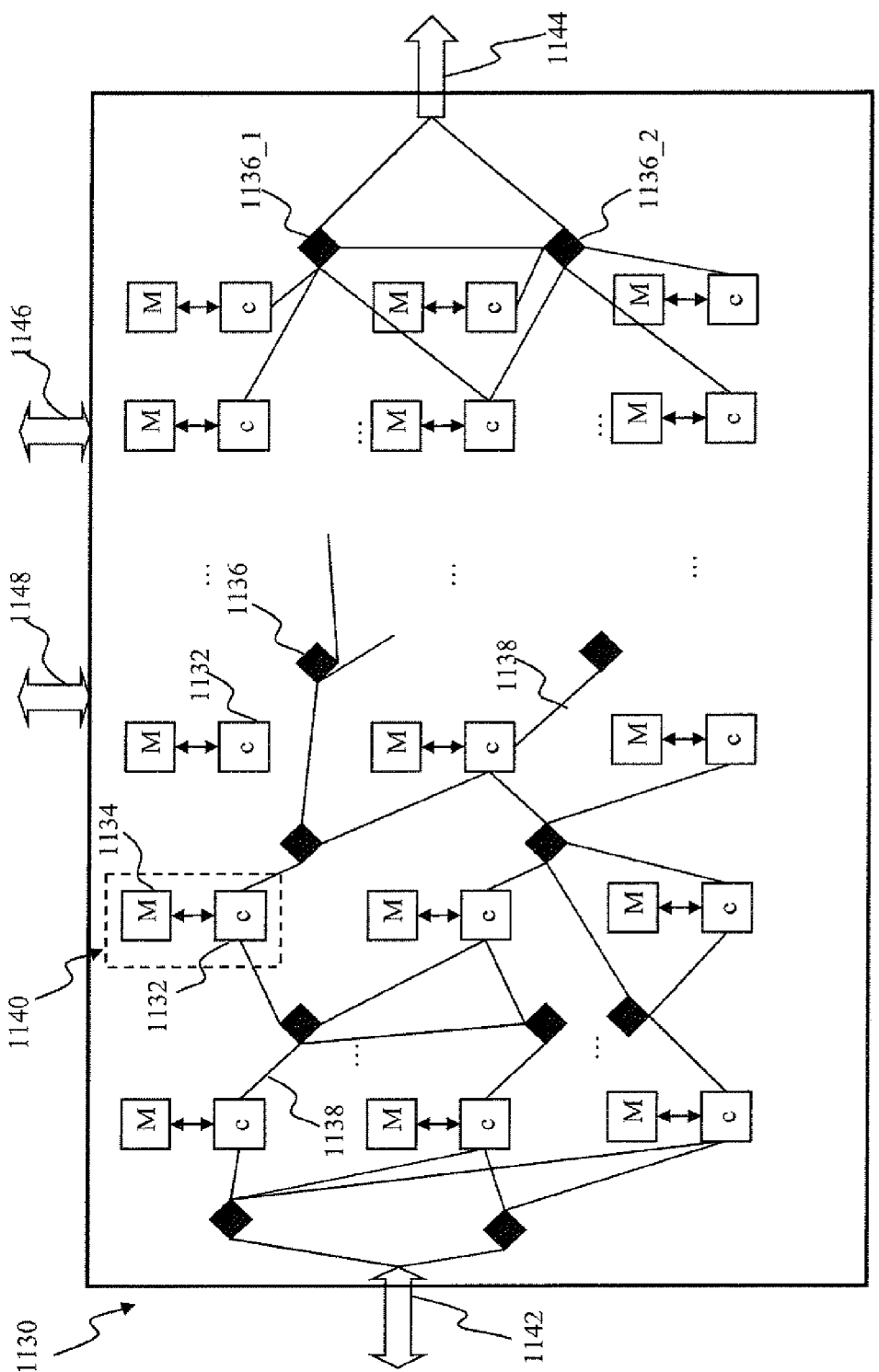
FIG. 11B is a block diagram illustrating a neuromorphic computerized system useful with inverse-STDP feedback adjustment in a spiking network, in accordance with one or more implementations.

Referring now to FIG. 11B, one implementation of neuromorphic computerized system configured to implement inverse STDP context connection adjustment in a spiking network is described in detail. The neuromorphic processing system 1130 of FIG. 11B comprises a plurality of processing blocks (micro-blocks) 1140 where each micro core comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11B is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
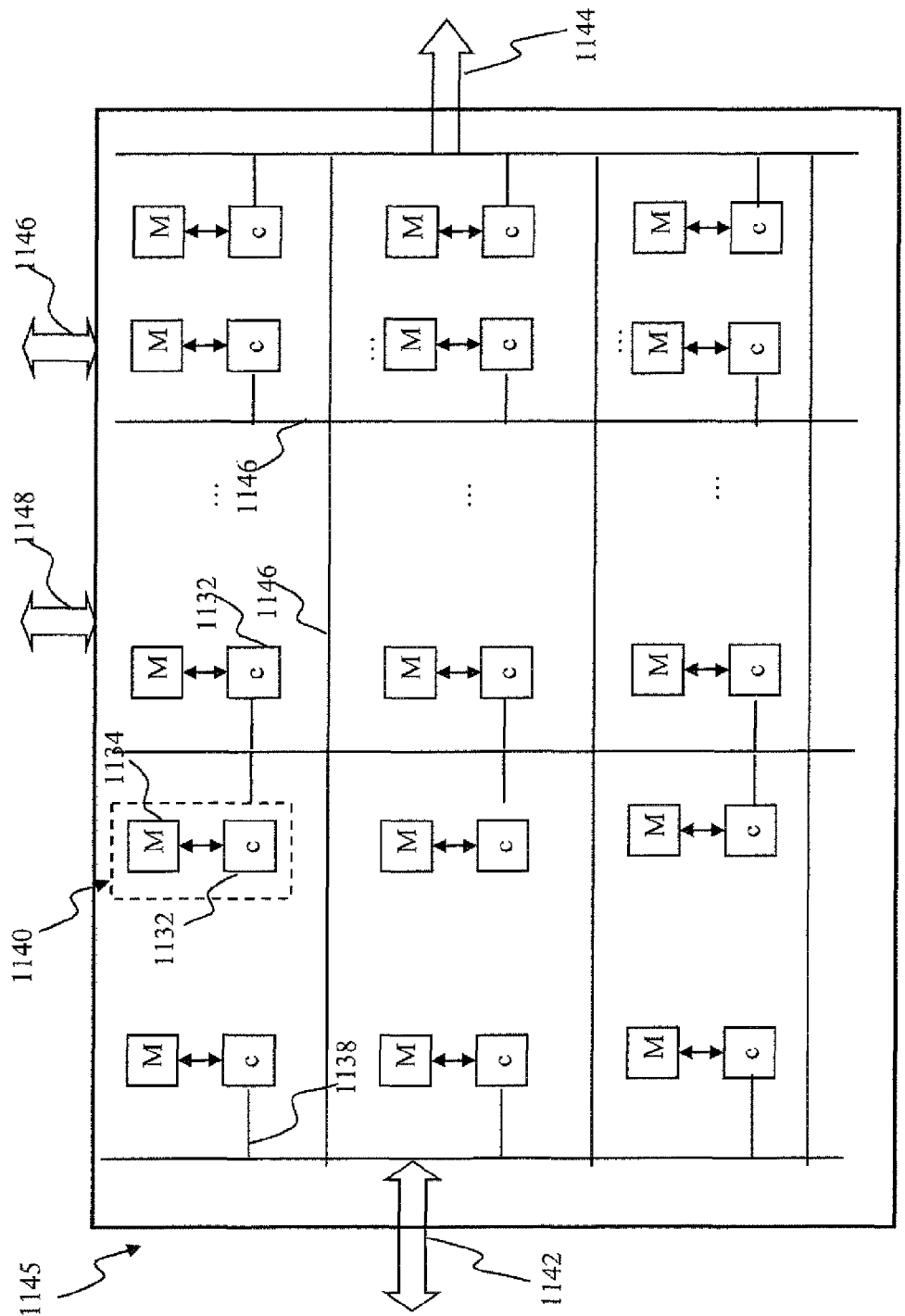
FIG. 11C is a block diagram illustrating a hierarchical neuromorphic computerized system architecture useful with inverse-STDP feedback adjustment in a spiking network, in accordance with one or more implementations.

FIG. 11C, illustrates one or more implementation of shared bus neuromorphic computerized system comprising microblocks, described with respect to FIG. 11B, supra. architecture coupled to a shared) 1140. The apparatus 1145 of FIG. 11C utilized one o (or more) shared bus 1146 in order to interconnect micro-blocks 1140 with one another.

Figure 11D:
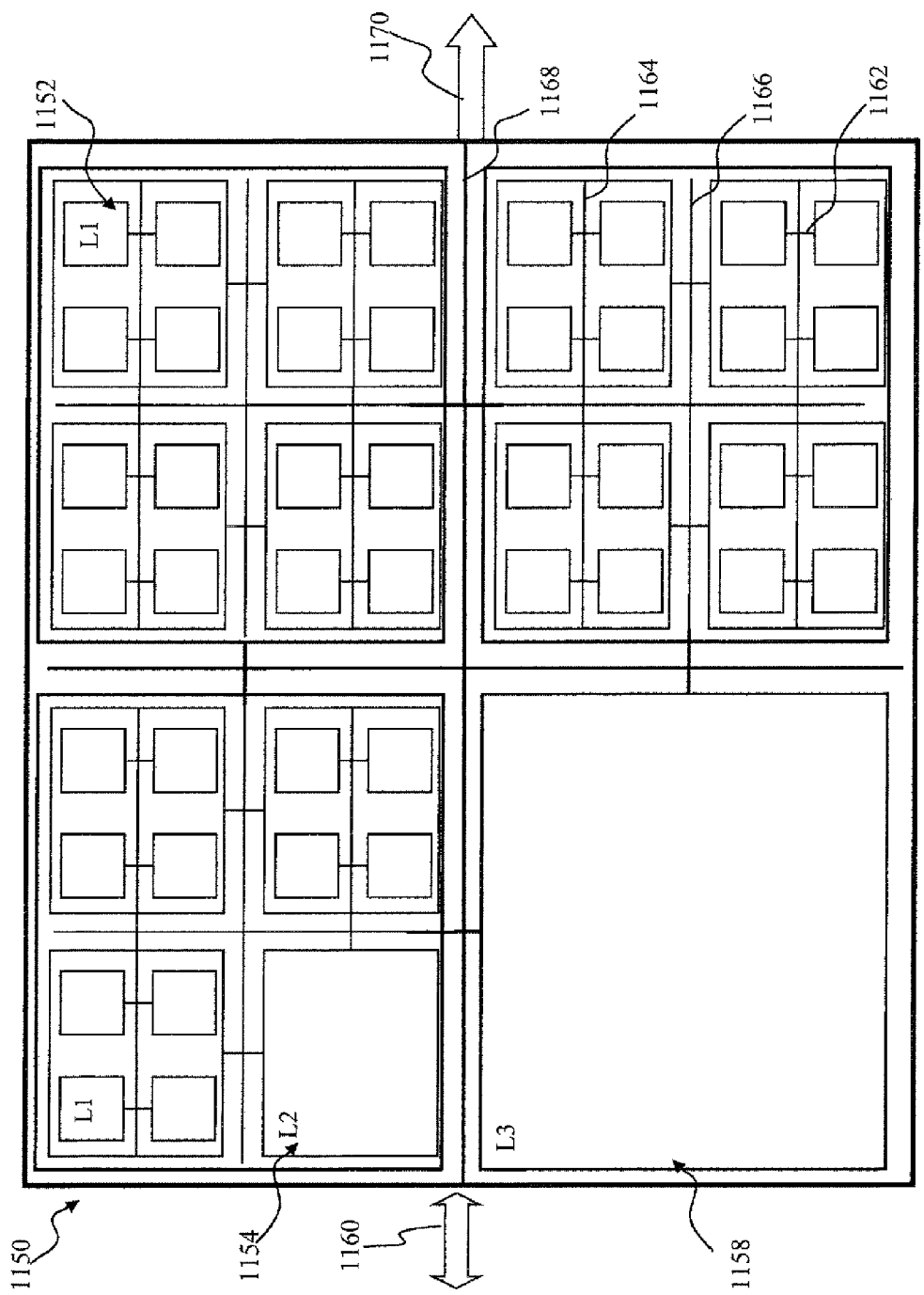
FIG. 11D is a block diagram illustrating a cell-type neuromorphic computerized system architecture useful with inverse-STDP feedback adjustment in a spiking network, in accordance with one or more implementations.

FIG. 11D, illustrates one implementation of cell-based neuromorphic computerized system architecture configured to implement inverse STDP context connection adjustment in a spiking network is described in detail. The neuromorphic system 1150 of FIG. comprises a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranges in a cluster and communicate with one another a local interconnects 1162, 1164. Each such cluster may form higher level cell, e.g., cell L2, denoted as 1154 in FIG. 11*d*. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, etc.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and previously stored network configuration is loaded in its place.

Exemplary Uses and Applications of Certain Aspects of the Disclosure

Various aspects of the disclosure may advantageously be applied to, inter alia, the design and operation of large spiking neural networks configured to process streams of input stimuli, in order to aid in detection and functional binding related aspect of the input.

Context Aided Object Recognition

The various principles and aspects described herein may be combined with other mechanisms of forming feed-forward connectivity in neural networks (such as those described in, for example, U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra), in order to detect objects in sensory input.

Figure 12:
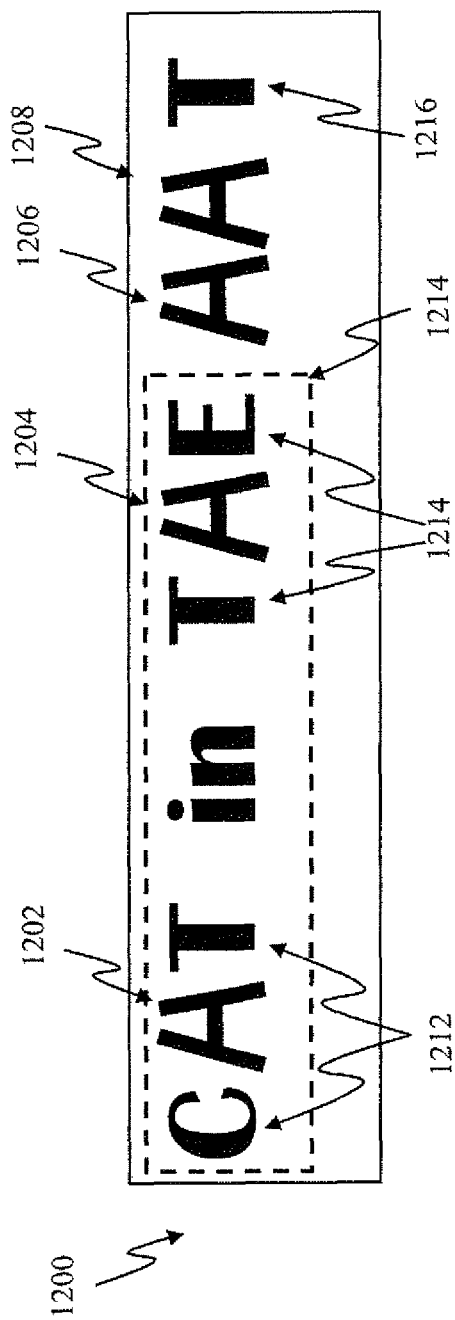
FIG. 12 is a graphical illustration of context-based object recognition process useful with inverse-STDP feedback adjustment in a spiking network, in accordance with one or more implementations.

FIG. 12 illustrates an exemplary application of the connection plasticity of the present disclosure to context-based visual object recognition. The input frame 1200 in FIG. 12 comprises several letters (objects). While some of the letters, i.e., 'C', 'T', 'E' are easily discernible, letters 'H' and 'A' (denoted by arrows 1202, 1204, 1206, 1208 in FIG. 12) are distorted, due to a printer head misalignment, or noise in a communication line, or even intentional distortion (see e.g., 'captcha' technology). The frame 1200 is received by the object recognition apparatus (e.g., the encoder 1024 of FIG. 10 described above), which encodes the frame 1200 for further processing by a spiking network (e.g., the network 900 of FIG. 9A using inverse-STDP plasticity rules for implementing synaptic plasticity in connections providing context information neurons within the network).

As shown in FIG. 12, when neuron(s), recognize the object 1202 process feed-forward input corresponding solely to the object 1202, the outcome may be either the letters 'A', or 'H', where the latter outcome may be more likely: $p('H') \geq p('A')$. However, when the neurons processing feed-forward inputs caused by the objects 1212 (i.e., the letters surrounding the letter 'A' in the word 'CAT'), the outcome of the recognition of the object 1202 by the respective neuron(s) will more likely be the letter 'A' so that $p('A') \gg p('H')$. Thus, the neurons that process objects 1212 provide lateral context to the neuron processing the object 1202 in FIG. 12.

Similarly, the neurons processing inputs corresponding to the objects 1214 provide lateral context to the neuron processing the object 1204 in FIG. 12.

The portion of the network that processes and recognizes the object 1214 (i.e., the phrase "CAT IN THE") may provide hierarchical context (i.e., feedback), together with the lateral context associated with the object 1216, to neurons processing input associated with the objects 1206, 1208, thereby enabling the network to properly reconstruct the word 'HAT'.

The emergence of the trained network may require network exposure to long input sequences (e.g., visual modality input streams maybe comprise between a few minutes to a few months of input). Typically, the time scale of weight modification is 3-6 orders of magnitude slower than the neuron dynamics; e.g., if the neuron is updated every 1 ms, the significant changes to the value of synaptic weight may span 8 (or more) orders of magnitude.

It is appreciated by those skilled in the arts that above implementation are exemplary, and the framework of the invention is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. Computer readable apparatus comprising a non-transitory storage medium, said non-transitory storage medium comprising a plurality of instructions to implement adjustment of a weight of a connection of a spiking neuronal network, the instructions configured to, when executed:
   increase the weight based at least on a response generated by at least one neuron of the network prior to receipt of an input signal; and
   reduce said weight based on said input signal preceding said response;
   wherein said connection is configured to communicate said input signal to said at least one neuron;
   the input signal is configured to convey information related to a context, the context comprising a feedback provided by another neuron of the network; and
   wherein said reduction and said increase of said connection weight cooperate to effect control of context-based response generation by said at least one neuron.

2. The apparatus of claim 1, wherein the plurality of instructions are further configured to receive, at said at least one neuron, an input stimulus associated with said context;
   wherein the context is configured to indicate to the at least one neuron an occurrence of a representation of an object in the input stimulus; and
   wherein said context-based response generation comprises generation of said response based at least in part on said input stimulus and said signal.

3. The apparatus of claim 2, wherein the plurality of instructions are further configured to:
   receive, via said another neuron, at least a portion of said input stimulus; and
   cause provision of said feedback from said another neuron to said at least one neuron, said feedback being generated by said another neuron based at least in part on said portion of said input.

4. The apparatus of claim 2, wherein said weight reduction is configured to decrease a probability of generating one other response by said at least one neuron, said one other pulse based on subsequent input stimulus associated with said context, said subsequent input stimulus occurring subsequent to (i) said input signal; and (ii) said context-based response.

5. The apparatus of claim 2, wherein:
   said at least one neuron is operated according to a model; and
   application of said reduced weight comprises application to said model, said application being delayed until receipt of subsequent input stimulus by said at least one neuron.

6. The apparatus of claim 2, wherein said increase in said weight is characterized by a time-dependent function having a time window associated therewith.

7. The apparatus of claim 2, wherein said reduction of said weight is characterized by a time-dependent function having a time window associated therewith.

8. The apparatus of claim 7, wherein:
   said response is characterized by a firing time, and said input signal is characterized by a context time;
   said time window is selected based at least in part on said firing time and said context time; and
   an integration of said function over said time window generates a negative value.

9. The apparatus of claim 7, wherein duration of said time window ranges between 5 ms and 50 ms.

10. The apparatus of claim 9, wherein:
    said response is characterized by a firing time, and said input signal is characterized by a context time;
    said time window is selected based at least in part on said firing time and said context time; and
    an integration of said function over said time window generates a positive value.

11. A computerized spiking network visual object recognition apparatus, comprising:
    a receiving cell-based neuron logic configured to receive visual input associated with an object, and to provide a stimulus signal, said stimulus signal configured based at least in part on said visual input;
    a first spiking cell-based neuron logic configured to receive at least a portion of said stimulus signal, and to generate a response; and
    a second spiking cell-based neuron logic configured to receive at least a portion of said stimulus signal, and to provide a context signal to the first spiking cell-based neuron logic via a context connection;
    wherein the apparatus is configured to:
       depress said context connection when said context signal precedes said response;
       potentiate said context connection when said response precedes said context signal; and
       wherein the context comprises a feedback indication.

12. The apparatus of claim 11, wherein:
    said generation of said response is characterized by a probability value; and
    said depression said context connection is configured to reduce said probability value when said response is generated responsive to said context signal.

13. The apparatus of claim 11, wherein:
    said first spiking cell-based neuron logic has a sensing field associated therewith; and
    said response is configured to be generated based at least in part on a feature of said object being sensed by said sensing field, said feature causing said at least a portion of said stimulus signal.

14. The apparatus of claim 13, wherein:
    said second spiking cell-based neuron logic has at least one other sensing field associated therewith; and
    said context signal is configured to be generated based at least in part on said object being sensed by said at least one other sensing field.

15. The apparatus of claim 11, wherein depression and potentiation are configured to cooperate to eliminate positive feedback occurring within a loop, said loop comprising said context connection and at least one other connection configured to deliver said at least a portion of said stimulus signal to said second spiking cell-based neuron logic.

16. The apparatus of claim 11 wherein:
    said context signal is associated with a feature of said object; and
    said stimulus signal is associated with said object.

17. The apparatus of claim 11, wherein:
    said first spiking cell-based neuron logic has a sensing field associated therewith; and
    said response is configured to be generated based at least in part on a feature of said object being sensed by said sensing field.

18. The apparatus of claim 11, wherein said visual input comprises digital data representative of the object.

19. The apparatus of claim 11, wherein said visual input comprises input electromagnetic radiation associated with the object.

20. A computerized spiking network apparatus for processing of sensory information, the apparatus comprising:

a spiking cell-based neuron logic configured to receive at least a portion of the sensory information, and to generate a response; and a context connection configured to communicate a context signal to said cell-based neuron logic;

wherein the apparatus is configured to depress said context connection, based at least in part on said context signal preceding said response, thereby mitigating formation of positive feedback within a loop associated with said cell-based neuron logic; and wherein the context signal comprises a feedback from at least one other spiking cell-based neuron logic within said network.

21. The apparatus of claim 20, wherein:

said context signal is related to said sensory information, said context signal configured to aid said processing apparatus to produce the response based on said sensory information.

22. The apparatus of claim 21, wherein:

the apparatus is further configured to potentiate said context connection based at least in part on said response preceding said context signal; and said depression and said potentiation are configured to cooperate to enable control of context-based generation of said response.

23. The apparatus of claim 22, wherein said loop comprises:

said cell-based neuron logic;

said context connection; and said at least one other spiking cell-based neuron logic.

24. The apparatus of claim 22, wherein said at least one other spiking cell-based neuron logic is configured to receive at least a portion of said sensory information.

25. The apparatus of claim 20, wherein:

said sensory information comprises a plurality of spikes configured to encode sensory signal of first modality, and said response is configured to be generated responsive to the sensory signal of said first modality.

26. The apparatus of claim 25, wherein:

said sensory information-further comprises another plurality of spikes configured to encode sensory signal of a second modality; and said context signal is associated with said sensory signal of said second modality.

27. The apparatus of claim 26, wherein said first modality comprises visual modality, and said context signal is associated with a control signal.

* * * * *